United States Patent
Watanabe

(10) Patent No.: US 8,446,633 B2
(45) Date of Patent: May 21, 2013

(54) PRINT DATA GENERATING APPARATUS AND METHOD FOR DESIGNATING A MAXIMUM ALLOWABLE DENSITY OF WHITE COLORANT

(75) Inventor: Takeshi Watanabe, Nagoya (JP)

(73) Assignee: Brother Kogyo Kabushiki Kasiha, Nagoya (JP)

( * ) Notice: Subject to any disclaimer, the term of this patent is extended or adjusted under 35 U.S.C. 154(b) by 1007 days.

(21) Appl. No.: 12/370,838

(22) Filed: Feb. 13, 2009

(65) Prior Publication Data

US 2009/0244568 A1    Oct. 1, 2009

(30) Foreign Application Priority Data

Mar. 31, 2008    (JP) ................ 2008-091001

(51) Int. Cl.
*H04N 1/60*    (2006.01)
(52) U.S. Cl.
USPC .......... 358/1.9; 358/501; 358/504; 358/518; 347/9; 347/14; 347/15; 347/212
(58) Field of Classification Search
None
See application file for complete search history.

(56) References Cited

U.S. PATENT DOCUMENTS

| | | | |
|---|---|---|---|
| 5,933,578 A * | 8/1999 | Van de Capelle et al. | 358/1.9 |
| 7,050,196 B1 | 5/2006 | Piatt et al. | |
| 7,450,278 B2 * | 11/2008 | Nakazawa | 358/504 |
| 7,583,421 B2 * | 9/2009 | Watanabe | 358/518 |
| 7,717,532 B2 * | 5/2010 | Kroon et al. | 347/15 |
| 8,035,854 B2 * | 10/2011 | Watanabe | 358/1.9 |
| 8,243,337 B2 * | 8/2012 | Ogawa | 358/3.27 |
| 2006/0139705 A1 | 6/2006 | Piatt et al. | |
| 2006/0158473 A1 * | 7/2006 | Mills et al. | 347/15 |
| 2006/0250427 A1 | 11/2006 | Kroon et al. | |
| 2007/0188535 A1 * | 8/2007 | Elwakil et al. | 347/15 |
| 2007/0201062 A1 * | 8/2007 | Watanabe | 358/1.9 |
| 2007/0216920 A1 * | 9/2007 | Watanabe | 358/1.9 |
| 2009/0033961 A1 * | 2/2009 | Tamagawa | 358/1.9 |

(Continued)

FOREIGN PATENT DOCUMENTS

| | | |
|---|---|---|
| EP | 1 168 822 A1 | 1/2002 |
| EP | 1 835 725 A1 | 9/2007 |

(Continued)

OTHER PUBLICATIONS

European Search Report for corresponding European Patent Application No. 09154892.5, mailed on Jul. 21, 2010.

(Continued)

*Primary Examiner* — Dung Tran
(74) *Attorney, Agent, or Firm* — Oliff & Berridge, PLC

(57) ABSTRACT

A print data generating apparatus to generate print data is provided. The print data generating apparatus includes a maximum density setting unit, through which a maximum allowable density of a white colorant is designated, an image storing unit to store originally inputted image data, a data convertor unit to convert the inputted image data into a colorant-enabled data, which is information concerning pixels composing the image in scale values of the plurality of colors, and a density-adjusted data generating unit to generate white density-adjusted data, in which the scale values of the pixels in the colorant-enabled data are adjusted according to the maximum allowable density of the white colorant. The density-adjusted data generating unit adjusts the scale values of white in the pixels in the colorant-enabled data to be lower than or equal to scale values corresponding to the maximum allowable density.

21 Claims, 18 Drawing Sheets

U.S. PATENT DOCUMENTS

| | | | |
|---|---|---|---|
| 2009/0296173 A1* | 12/2009 | Mestha et al. | 358/518 |
| 2010/0214340 A1* | 8/2010 | Sugahara et al. | 347/14 |
| 2011/0050792 A1* | 3/2011 | Kagata et al. | 347/21 |

FOREIGN PATENT DOCUMENTS

| | | |
|---|---|---|
| JP | A-8-11310 | 1/1996 |
| JP | A-2001-251528 | 9/2001 |
| JP | A-2001-287407 | 10/2001 |
| JP | A-2002-268318 | 9/2002 |
| JP | A-2003-143422 | 5/2003 |
| JP | A-2004-289200 | 10/2004 |
| JP | A-2005-153314 | 6/2005 |
| JP | A-2005-262553 | 9/2005 |
| JP | A-2007-228316 | 9/2007 |

OTHER PUBLICATIONS

Sep. 18, 2012 Office Action issued in Japanese Patent Application No. 2008-091001 (with translation).

* cited by examiner

161

| COLOR CONVERSION TABLE |||||||
|---|---|---|---|---|---|---|
| sRGB SCALE VALUE ||| CMYK SCALE VALUE ||||
| R | G | R | C | M | Y | K |
| 0 | 0 | 0 | 0 | 0 | 0 | 0 |
| 64 | 0 | 0 | 0 | 32 | 45 | 0 |
| 128 | 0 | 0 | 0 | 101 | 123 | 0 |
| 192 | 0 | 0 | 0 | 190 | 210 | 0 |
| 255 | 0 | 0 | 0 | 255 | 250 | 0 |
| 0 | 64 | 0 | 50 | 23 | 10 | 10 |
| 64 | 64 | 0 | 100 | 32 | 45 | 35 |
| 128 | 64 | 0 | 80 | 62 | 70 | 55 |
| 192 | 64 | 0 | 20 | 102 | 190 | 15 |
| 255 | 64 | 0 | 0 | 180 | 250 | 0 |
| ... | ... | ... | ... | ... | ... | ... |
| 0 | 192 | 255 | 255 | 20 | 0 | 0 |
| 64 | 192 | 255 | 190 | 21 | 0 | 0 |
| 128 | 192 | 255 | 128 | 31 | 0 | 0 |
| 192 | 192 | 255 | 54 | 25 | 0 | 0 |
| 255 | 192 | 255 | 0 | 20 | 0 | 0 |
| 0 | 255 | 255 | 255 | 10 | 0 | 0 |
| 64 | 255 | 255 | 198 | 2 | 0 | 0 |
| 128 | 255 | 255 | 130 | 0 | 0 | 0 |
| 192 | 255 | 255 | 55 | 0 | 0 | 0 |
| 255 | 255 | 255 | 0 | 0 | 0 | 0 |

FIG. 7

| L * VALUE | MAXIMUM WHITE INK DENSITY (%) |
|---|---|
| L * VALUE < 60 | 400 |
| 60 ≤ L * VALUE < 70 | 360 |
| 70 ≤ L * VALUE < 80 | 320 |
| 80 ≤ L * VALUE < 90 | 280 |
| 90 ≤ L * VALUE | 0 |

US 8,446,633 B2

PRINT DATA GENERATING APPARATUS AND METHOD FOR DESIGNATING A MAXIMUM ALLOWABLE DENSITY OF WHITE COLORANT

CROSS REFERENCE TO RELATED APPLICATION

This application claims priority from Japanese Patent Application No. 2008-091001, filed on Mar. 31, 2008, the entire subject matter of which is incorporated herein by reference.

BACKGROUND

1. Technical Field

Aspects of the present invention relate to a print data generating apparatus, a printing apparatus, a method to generate print data, and a computer usable medium therefor, and more specifically, to an apparatus, a method, and a computer usable medium to generate print data, by which a maximum density of colorant in a predetermined color to form a pixel can be adjusted, and a printing apparatus to print an image according to the print data.

2. Related Art

Conventionally, an inkjet printing apparatus, which ejects a plurality of colors of ink drops and white opaque ink drops onto a recording medium, has been known. In the inkjet printing apparatus, the inks are drawn from ink reservoirs to a plurality of ejecting channels provided in an inkjet head and ejected from nozzles at the end of the ejecting channels when actuators such as heater elements and piezoelectric elements are selectively activated. When an image is formed in colors, each of pixels composing the image is resolved, for example, into the three primary colors, which are cyan (C), magenta (M), and yellow (Y), thereafter, a colored pixel is formed as the inks adjusted in their densities are ejected onto the recording medium. In addition, a pixel in a black color can be reproduced in black (K) ink.

Further, in order to obtain images in higher quality, white (W) opaque ink can be used to reproduce white pixels and to form a base layer on a colored recording medium so that colored pixels can be reproduced clearly over the base layer regardless of the color of the recording medium. Such a printing apparatus is disclosed in, for example, Japanese Patent Provisional Publication No. 2005-153314. According to the printing apparatus in the publication, images in higher quality can be reproduced by adjusting amounts of the white ink and the colored inks to be ejected.

When images are formed on different types of recording sheets, color appearances of printed images may vary depending on colors of the recording sheets. Therefore, an inkjet printer capable of measuring whiteness of the recording to automatically determine amounts of inks to be ejected based on the whiteness is suggested so that color appearances of printed images can be substantially uniform regardless of the whiteness of the recording sheets. Such an inkjet printer is disclosed in, for example, Japanese Patent Provisional Publication No. H08-11310. According to the above publication, the inkjet printer receives light emitted from a light source and reflected on the recording sheet and detects whiteness of the recording sheet based on a difference of intensities between the emitted light and the reflected light. According to the detected whiteness and preliminarily obtained information concerning densities of the inks to be ejected, inkjet heads are driven to eject inks so that densities of the inks can be substantially uniformly adjusted regardless of whiteness of the recording sheets.

SUMMARY

According to the printing apparatus in the former publication, however, an entire area on which an image is to be formed in the colored inks is painted in the white ink in an uniform density. Therefore, amounts of the white ink to be used and cost for the ink tend to be increased. Further, because the white ink is ejected in uniform density, gradation of white is not reproducible.

According to the inkjet printer in the latter publication, the densities of the white ink to be ejected is determined based on the whiteness of the recording sheets, but consideration for other factors that may affect the appearances of the images on the recording sheets, such as materials and textures of the recording sheets, cannot be included in the determination. Therefore, the determined densities of the ejected ink may not necessarily match the recording sheets.

In view of the above drawbacks, the present invention is advantageous in that a print data generating apparatus, a printing apparatus, a method to generate print data, and a computer usable medium therefor, by which a maximum density of white ink to be used can be adjusted, are provided.

According to an aspect of the invention, a print data generating apparatus to generate print data, which is to be used in a printing apparatus to form an image in a plurality of colors of colorants including a white colorant, based on originally inputted image data representing the image, is provided. The print data generating apparatus includes a maximum density setting unit, through which a maximum allowable density of the white colorant to be used to form the image is designated, an image storing unit to store the originally inputted image data, a data convertor unit to convert the originally inputted image data into a colorant-enabled data, which is information concerning pixels composing the image in scale values of the plurality of colors, and a density-adjusted data generating unit to generate white density-adjusted data, in which the scale values of the pixels in the colorant-enabled data are adjusted according to the maximum allowable density of the white colorant designated through the maximum density setting unit. The density-adjusted data generating unit adjusts the scale values of white in the pixels in the colorant-enabled data to be lower than or equal to scale values corresponding to the maximum allowable density.

According to another aspect of the invention, a printing apparatus to form an image in a plurality of colors of colorants including a white colorant based on print data, is provided. The printing apparatus includes a data receiver unit to receive the print data transmitted from a print data generating apparatus, a plurality of print heads to eject the plurality of colorants onto a recording medium, a medium holder to hold the recording medium in a printable posture, a drive unit to drive at least one of the plurality of print heads and the medium holder according to the print data, and a print control unit to controls the plurality of print heads and the drive unit to form the image on the recording medium according to the print data, in which scale values of the white colorant are adjusted to be lower than or equal to scale values corresponding to a predetermined maximum allowable density.

According to the above configurations, white densities in pixels in the print data are smaller than or equal to the maximum allowable density Thus, the densities of the white colorant to be used to form the image on the recording medium can be adjusted in accordance with the user's input to designate the maximum white density. Therefore, the user can determine preferable densities for the white pixels. Therefore, overuse of the white colorant can be avoided, and cost for printing can be reduced.

According to still another aspect of the invention, a printing apparatus to form an image in a plurality of colors of colorants including a white colorant based on print data, is provides. The printing apparatus includes a plurality of print heads to eject the plurality of colorants onto a recording medium, a medium holder to hold the recording medium in a printable posture, a drive unit to drive at least one of the plurality of print heads and the medium holder according to the print data, a print control unit to control the plurality of print heads and the drive unit to form the image on the recording medium according to the print data, a test pattern data storing unit to store test pattern data, which represents at least one of test patterns, each test pattern including a plurality of density-indicative graphics, in which densities of the colorants to form the graphics are varied in steps, and a test pattern designating unit to designate the test pattern data to be transmitted to the printing apparatus. The print control unit controls the plurality of print heads and the drive unit to form one of the first print pattern, the second print pattern, and the third print pattern according to the test pattern data.

According to the above configurations, the test patterns indicating the graphics formed in various white densities can be printed so that the user can view the test pattern to determine preferable white densities for the image to be printed on the recording medium.

According to still another aspect of the invention, a method to generate print data to be used in a printing apparatus to form an image, based on originally inputted image data representing the image, is provided. The method includes steps of designating a maximum allowable density of the white colorant to be used to form the image, storing the originally inputted image data, converting the originally inputted image data into a colorant-enabled data, which is information concerning pixels composing the image in scale values of the plurality of colors, and generating white density-adjusted data, in which the scale values of the pixels in the colorant-enabled data are adjusted according to the maximum allowable density of the white colorant designated in the step of designating. The scale values of white in the pixels in the colorant-enabled data are adjusted to be lower than or equal to scale values corresponding to the maximum allowable density in the step of generating.

According to still another aspect of the invention, a computer usable medium to comprise computer readable instructions to control a computer to generate print data, which is to be used in a printing apparatus to form an image, based on originally inputted image data representing the image, is provided. The computer readable instructions controls the computer to execute steps of designating a maximum allowable density of the white colorant to be used to form the image, storing the originally inputted image data, converting the originally inputted image data into a colorant-enabled data, which is information concerning pixels composing the image in scale values of the plurality of colors, and generating white density-adjusted data, in which the scale values of the pixels in the colorant-enabled data are adjusted according to the maximum allowable density of the white colorant designated in the step of designating. The scale values of white in the pixels in the colorant-enabled data are adjusted to be lower than or equal to scale values corresponding to the maximum allowable density in the step of generating.

According to the above configurations, white densities in pixels in the print data are smaller than or equal to the maximum allowable density. Thus, the densities of the white colorant to be used to form the image on the recording medium can be adjusted in accordance with the user's input to designate the maximum white density. Therefore, the user can determine preferable densities for the white pixels. Therefore, overuse of the white colorant can be avoided, and cost for printing can be reduced.

BRIEF DESCRIPTION OF THE ACCOMPANYING DRAWINGS

FIG. 7 illustrates a data configuration of a color conversion table according to the first embodiment of the present invention.

DETAILED DESCRIPTION

Hereinafter, embodiments according to aspects of the present invention will be described with reference to the accompanying drawings.

Figure 1:
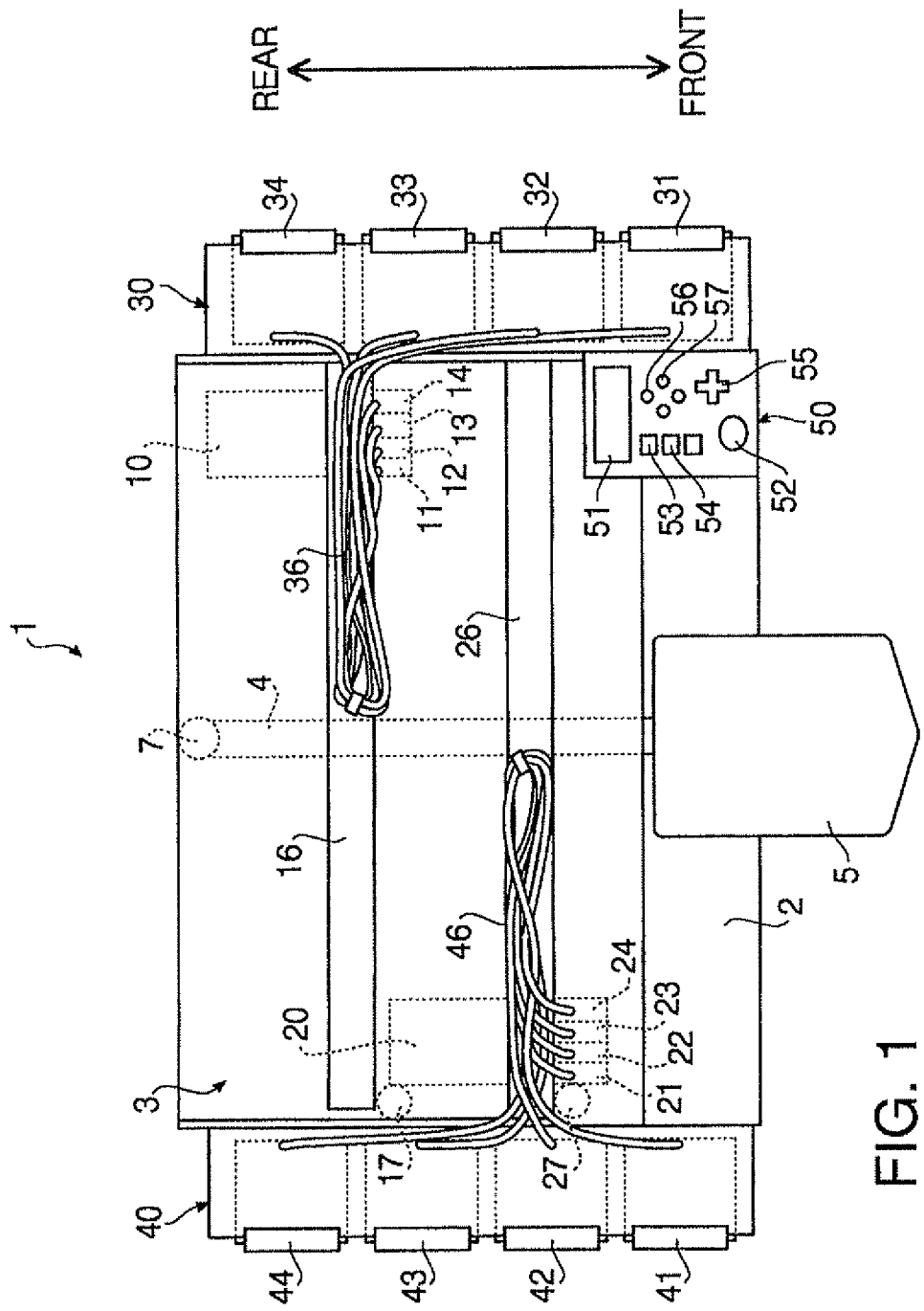
FIG. 1 is a plane view of an inkjet printer according to a first embodiment of the present invention.

An inkjet printer 1 according to a first embodiment of the present invention will be described with reference to FIG. 1. The inkjet printer 1 is a printing apparatus, which is capable of printing an image on a piece of fabric. FIG. 1 is a plane view of the inkjet printer 1 according to the first embodiment of the present invention.

As shown in FIG. 1, the inkjet printer 1 includes a flat base plate 2 at a bottom and a cover 3 to cover the entire body of the inkjet printer 1. The base plate 2 has longer sides which extend in a right-and-left (horizontal) direction in FIG. 1, and a rail 4 are aligned in parallel with a front-rear direction as indicated by an arrow at an approximate center of the base plate 2. The rail 4 supports a platen 5, which is interchangeable and movable in the front-rear direction (i.e., an auxiliary direction) along the rail 4. The platen 5 is carried along the rail 4 by a platen drive motor 7 being a stepping motor, which is provided at a rear end portion of the rail 4. The platen 5 is formed to have a substantially rectangular-shaped plate, on which a recording medium (e.g., a T-shirt) is placed in a printable posture.

At an approximately center but a relatively rear (i.e., closer to an upper side in FIG. 1) of the cover 3, above the platen 5, a first guide rail 16 to guide a first carriage 10 with four inkjet heads 11-14 mounted thereon is provided. In the vicinity of a left-hand end of the first guide rail 16, a first carriage motor 17 to drive the first carriage 10 is provided, while a pulley (not shown) is provided in the vicinity of a right-hand end of the first guide rail 16. Further, a carriage belt (not shown) is drawn between the first carriage motor 17 and the pulley under the first guide rail 16. The carriage belt is fixed to the first carriage 10 so that the first carriage 10 is reciprocated along the first guide rail 16 in the right-and-left direction (i.e., a main scanning direction) when the carriage motor 17 is activated.

On the right-hand end of the cover 3, a first ink cartridge storage 30, in which four ink cartridges 31-34 having inks therein are detachably attached, is provided. Each of the ink cartridges 31-34 is connected to each of inkjet heads 11-14 by flexible ink supplying tubes 36 so that the inks stored in the ink cartridges 31-34 are supplied to each channel of the inkjet heads 11-14. According to the present embodiment, all of the inkjet heads 11-14 are provided to discharge white ink therefrom, and the ink cartridges 31-34 respectively contain white ink.

At an approximately center but a relatively front (i.e., closer to a lower side in FIG. 1) portion of the cover 3, above the platen 5, a second guide rail 26, in parallel with the first guide rail 16, to guide a second carriage 20 with four inkjet heads 21-24 mounted thereon is provided. Further, a carriage belt (not shown) is drawn between the second carriage motor 27 and a pulley (not shown) under the second guide rail 26. The carriage belt is fixed to the second carriage 20 so that the second carriage 20 is reciprocated along the second guide rail 26 in the right-and-left direction (i.e., the main scanning direction) when the carriage motor 27 is activated.

In a left-end portion of the cover 3, a second ink cartridge storage 40, in which four ink cartridges 41-44 are stored, is provided. The ink cartridges 41-44 are respectively connected to the inkjet head 21-24 through ink supplying tubes 46 so that the inks in the ink cartridges 41-44 are supplied to each channel of the inkjet heads 21-24. The four ink cartridges 41-44 contain cyan (C) transparent ink, magenta (M) transparent ink, yellow (Y) transparent ink, and black (K) ink respectively.

Each of the inkjet heads 11-14 in the first carriage 10 and the inkjet heads 21-24 in the second carriage 20 is provided with a plurality of (for example, 128) ejection channels (not shown) through which the ink is conveyed. Each of the channels is provided with a piezoelectric actuator (not shown), which is activated individually, to discharge an ink drop downward onto the recording medium from ejection nozzles (not shown) that are open at a nozzle surface of each of the inkjet heads 11-14, 21-24. Further, at one of the right-hand end and the left-hand end of the reciprocative range of each of the first and second carriages 10, 20, a maintenance mechanism (not shown) such as a capping unit and a purge unit for the inkjet heads 11-14, 21-24 is provided.

At right-hand front of the inkjet printer 1 is provided an operation panel 50 through which a user inputs an instruction for the inkjet printer 1. The operation panel 50 includes a display 51, a print start button 52, a print cancel button 53, and a platen feed button 54, a direction key 55, an error indicator 56, and a data reception indicator 57. The display 51 is to display various information concerning, for example, operations in the inkjet printer 1. The print start button 52 is a button to be operated when a print operation is started. The cancel button 53 is a button to be operated when the print operation is ceased. When the platen feed button 54 is operated, the platen 5 is moved to a position wherein the fabric such as a T-shirt as the recording medium can be set on and removed from the platen 5. The direction key 55 is operated when, for example, the user selects an option concerning operations to be executed. The error indicator 56 is a lamp to be lit when an error occurs in the inkjet printer 1. The data reception indicator 57 is a lamp to be lit when print data is received in the inkjet printer 1

Figure 2:
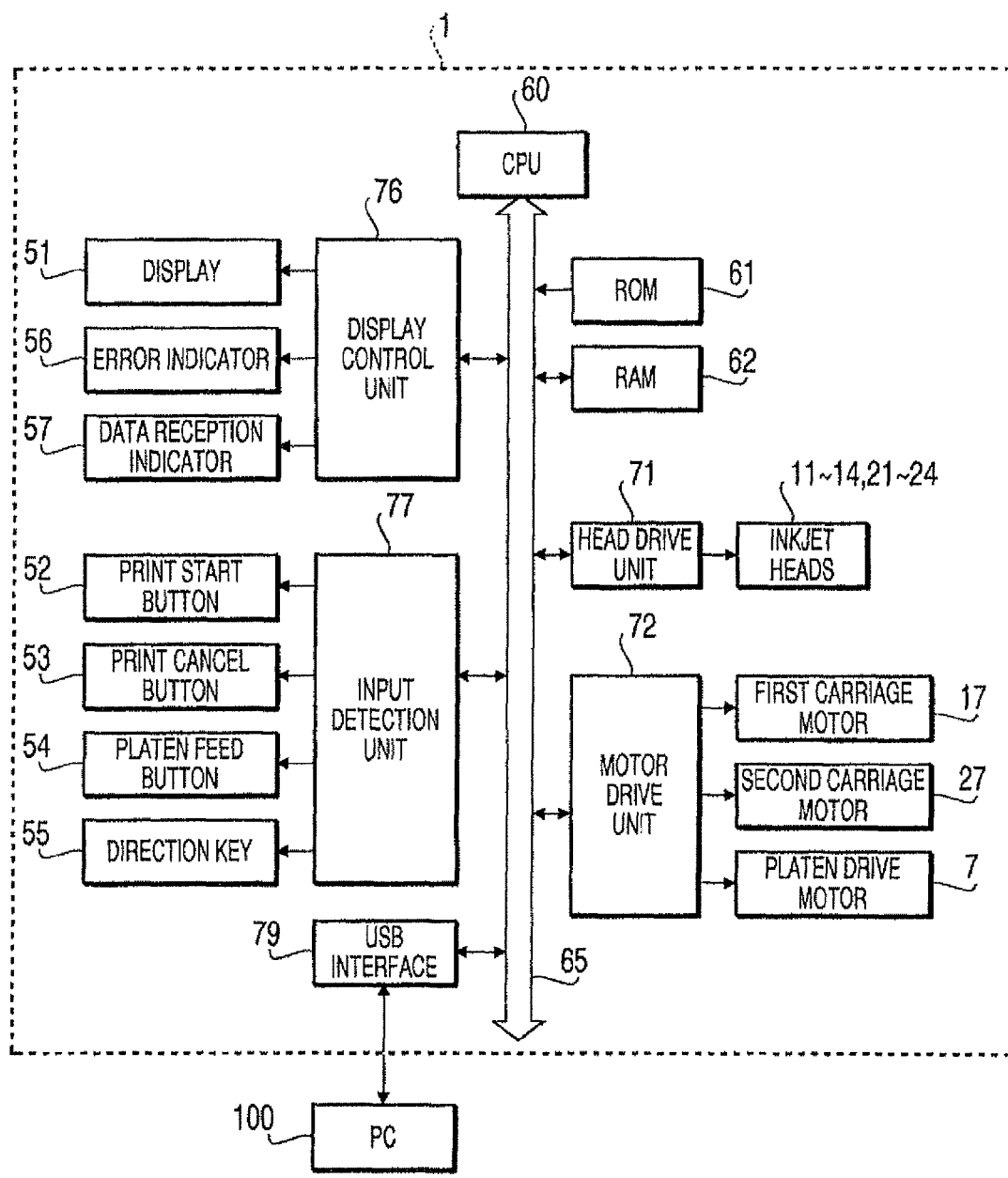
FIG. 2 is a block diagram to illustrate an electrical configuration of the inkjet printer according to the first embodiment of the present invention.

Next, referring to FIG. 2, an electrical configuration of the inkjet printer 1 will be described. FIG. 2 is a block diagram showing the electrical configuration of the inkjet printer 1 according to the present embodiment of the invention. As shown in FIG. 2, the inkjet printer 1 is provided with a CPU 60 that controls the entire operation in the inkjet printer 1. The CPU 60 is connected with a ROM 61, a RAM 62, a head drive unit 71, a motor drive unit 72, a display control unit 76, an input detection unit 77, and a USB interface 79. These components are connected to one another through a bus 65.

The ROM 61 includes a program storage area, wherein control programs to be executed by the CPU 60 to control operations of the inkjet printer 1 and printing programs to be executed for the printing operations are stored, and a program-related information storage area, wherein various information such as parameter settings, initial values, and data to be used in the programs are stored. Further, the ROM 61 may include various storage areas.

The RAM 62 in the inkjet printer 1 is provided with several areas including a received print data storing area for storing the print data transmitted from a PC 100, an in-printing data storing area for storing the print data being printed, and various information storing areas for storing various setting information.

The head drive unit 71 is connected to each of the inkjet heads 11-14, 21-24 and activates the piezoelectric actuators being provided to each channel of the inkjet heads 11-14, 21-24.

The motor drive unit 72 is connected to the first carriage motor 17, the second carriage motor 27, and the platen drive motor 7. Thus, the first and the second carriage motors 17, 27, and the platen drive motor 7 are controlled by the motor drive unit 72.

The display control unit 76 executes displaying processes of the display 51, the error indicator 56, and the data reception indicator 57, which are connected to the CPU 60 through the bus 65. The input detection unit 77 detects inputs through the print start button 52, the print cancel button 53, the platen feed button 54, and the direction key 55, which are connected to the CPU 60 through the bus 65. The USB interface 79 which allows communication between the inkjet printer 1 and external devices including the PC 100 through a USB cable (not shown).

With the aforementioned configuration of the inkjet printer 1 according to the embodiment, when the print data transmitted from the PC 100 is received in the inkjet printer 1, the user sets a piece of fabric on the platen 5 and presses the print button 52. Accordingly, the platen 5 with the fabric is moved to rearward in the cover 3 of the inkjet printer 1 along the rail 4 by the platen drive motor 7 so that the position of the first carriage 10 with respect to the platen 5 corresponds to a recording start position. Thereafter, the inkjet heads 11-14 eject the inks as the first carriage 10 is moved from the right-hand side to the left-hand side in the cover 3 according to a recording instruction so that recording of one line is executed. Further, the platen 5 is moved to frontward from the rearward in the cover 3 for an amount corresponding to one line, and the inkjet heads 11-14 eject the inks as the first carriage 10 is moved from the right-hand side to the left-hand side in the cover 3 according to the recording instruction so that recording of the next line is executed. Subsequently, the platen 5 is moved to frontward from the rearward in the cover 3 for the amount corresponding to another one line portion. By repeating this operation, printing in white ink is executed. Next, the inkjet printer 1 moves the platen 5 with the fabric to frontward so that the position of the second carriage 20 with respect to the platen 5 corresponds to the recording start position. The second carriage 20 is driven similarly to the first carriage 10 as described above so that the colored (CMYK) inks are ejected onto the fabric according to the recording instruction. At the end of the printing operation, the platen 5 is fed forth to a removable position wherein the fabric can be removed, thus the user removes the fabric which underwent the printing operation.

Figure 3:
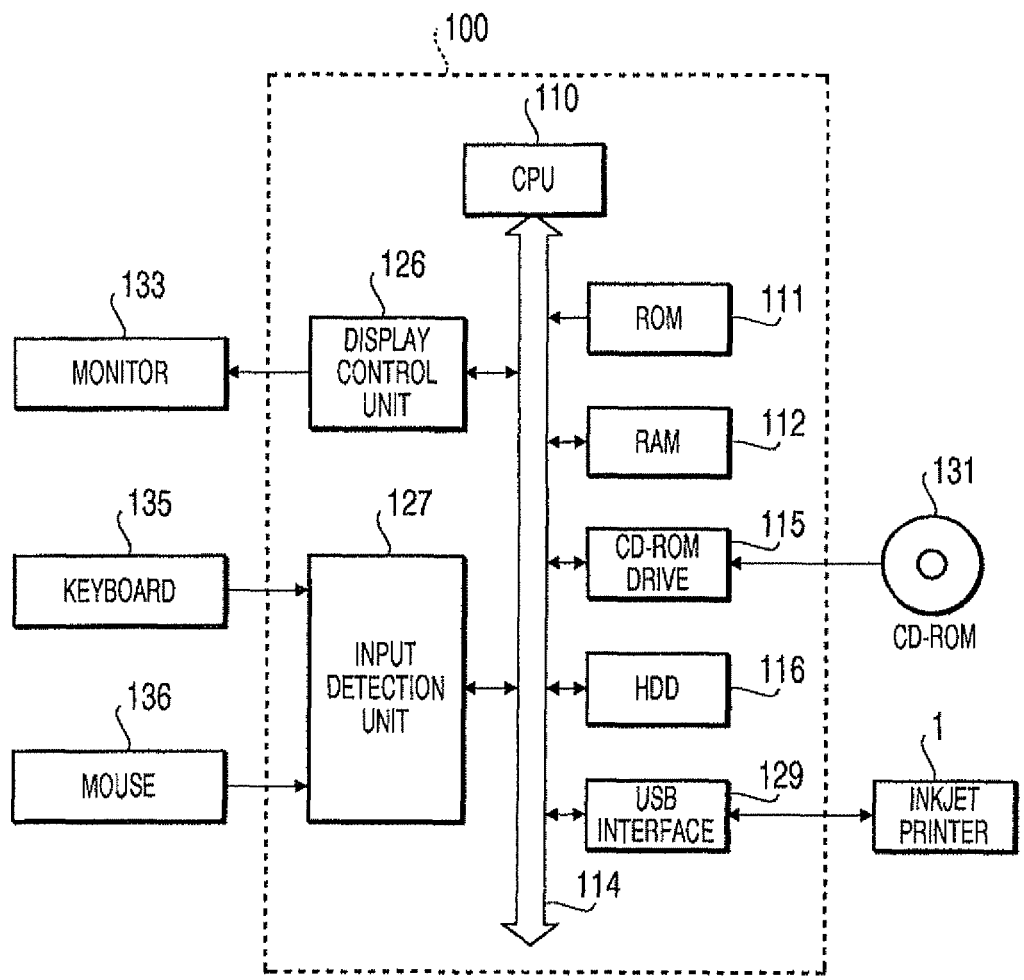
FIG. 3 is a block diagram to illustrate an electrical configuration of a PC (personal computer) according to the first embodiment of the present invention.
Figure 4:
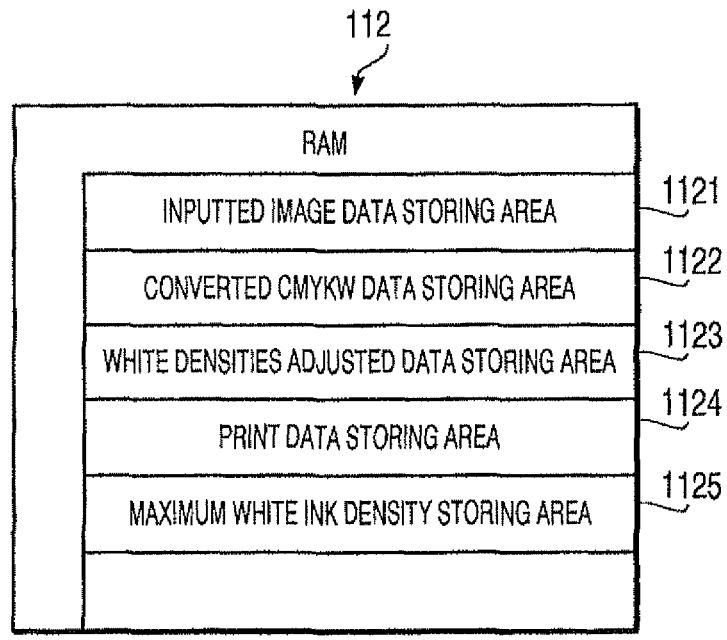
FIG. 4 is a schematic diagram of a RAM (random access memory) in the PC according to the first embodiment of the invention.
Figure 5:
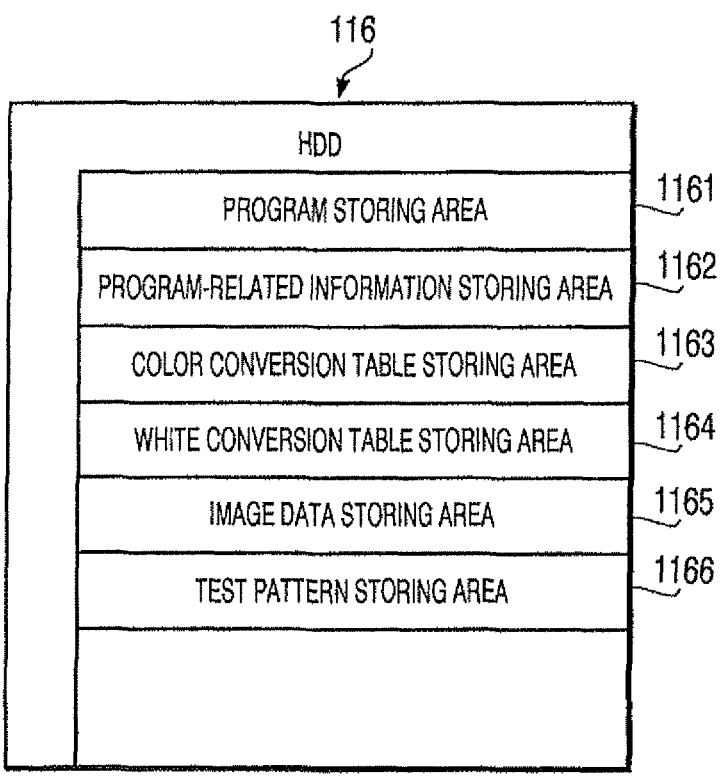
FIG. 5 is a schematic diagram of an HDD (hard disk drive) in the PC according to the first embodiment of the invention.

Next, a configuration of the PC 100 will be described with reference to FIGS. 3-5. FIG. 3 is a block diagram of an electrical configuration of the PC 100 according to the present embodiment of the invention. FIG. 4 is a schematic diagram of a RAM 112 in the PC 100 according to the present embodiment of the invention. FIG. 5 is a schematic diagram of an HDD 116 in the PC 100 according to the present embodiment of the invention. The PC 100 is connected to the inkjet printer 1 through a standardized communication cable, which is for example a USB. In the PC 100, print data is generated based on image data created by the user using various applications, and the print data is transmitted to the inkjet printer 1.

As shown in FIG. 3, the PC 100 is provided with a CPU 110 which controls the entire operation in the PC 100. The CPU 110 is connected with a ROM 111, a RAM 112, a CD-ROM drive 115, an HDD 116, a display control unit 126, an input detection unit 127, and a USB interface 129. These components are connected to one another through a bus 114.

The ROM 111 stores various information to be used in controlling programs, such as BIOS, to be executed by the CPU 110. The CD-ROM drive 115 is for reading data from a CD-ROM 131 inserted therein as a storage medium of data. The CD-ROM 131 stores data including a printer driver, which is a program to create the print data, and various settings, tables, and data to be used in the program. The data in the CD-ROM 131 is read by the CD-ROM drive 115 and stored in predetermined areas (see FIG. 5) in the HDD 11 6.

The display control unit 126 controls displaying processes to display information concerning an operation on a screen of a monitor 133. The input detection unit 127 is connected to input devices including a keyboard 135 and a mouse 136, which are operated by the user, and operations by the user to the input devices are detected by the input detection unit 127. The USB interface 129 allows communication between the PC 100 and external devices including the inkjet printer 1 through a USB cable (not shown).

As shown in FIG. 4, the RAM 112 is provided with several storage areas including an inputted image data storing area 1121, a converted CMYKW data storing area 1122, a white density adjusted data storing area 1123, a print data storing area 1124, and a maximum white ink density storing area 1125. The inputted image data storing area 1121 is a storage area for temporarily storing originally inputted image data 141 (see FIG. 6). The print data for printing an image is created based on the image data being stored in the inputted image data storing area 1121. The converted CMYKW data storing area 1122 is a storage area for storing converted CMYKW data 146 (see FIG. 6), which is converted from the inputted image data 141. The white density adjusted data storing area 1123 is a storage area for storing white density adjusted data 147 (see FIG. 6), in which densities of white in the converted CMYKW data 146 are adjusted. The print data storing area 1124 is a storage area for storing print data 148 (see FIG. 6), which is created based on the white density adjusted data 147. The print data storing area 1124 is a storage area for storing the print data 148, which is created based on the white density adjusted data 147. The maximum white ink density storing area 1125 is a storage area for storing information concerning a maximum density of the white ink determined by a user. Functions of the above-mentioned data in the RAM 112 will be described later in detail.

As shown in FIG. 5, the HDD 116 contains several storage areas including a program storing area 1161, a program-related information storing area 1162, a color conversion table storing area 1163, a white conversion table storing area 1164, an image data storing area 1165, and a test pattern storing area 1166. The program storing area 1161 is a storage area for storing various programs to be executed in the PC 100 including the printer driver. The program-related information storing area 1162 is a storage area for storing information concerning settings, initial values, and data necessary for executing the programs. The color conversion table storing area 1163 is a storage area for storing a color conversion table 161 (see FIG. 7). The color conversion table 161 defines correspondence between color information of the inputted image data 141, which is represented in RGB (red, green, blue) format, and a colored ink level, which is represented in a CMYK format. The color conversion table 161 is thus used for converting the inputted image data 141 into a colored ink level in CMYK format. The white conversion table storing area 1164 is a storage area for storing a white conversion table 162 (see FIG. 8). The white conversion table 162 is a table for converting the input data in 256 color scale in the sROB format into the output data in 256 color scale in W format. The image data storing area 1165 is a storage area for storing a plurality of pieces of image data 141. The test pattern storing area 1166 is a storage area for storing test pattern data, which includes information of a pilot print pattern to be printed on a recording medium. Functions of the above-mentioned data in the HDD 116 will be described later in detail.

Figure 6:
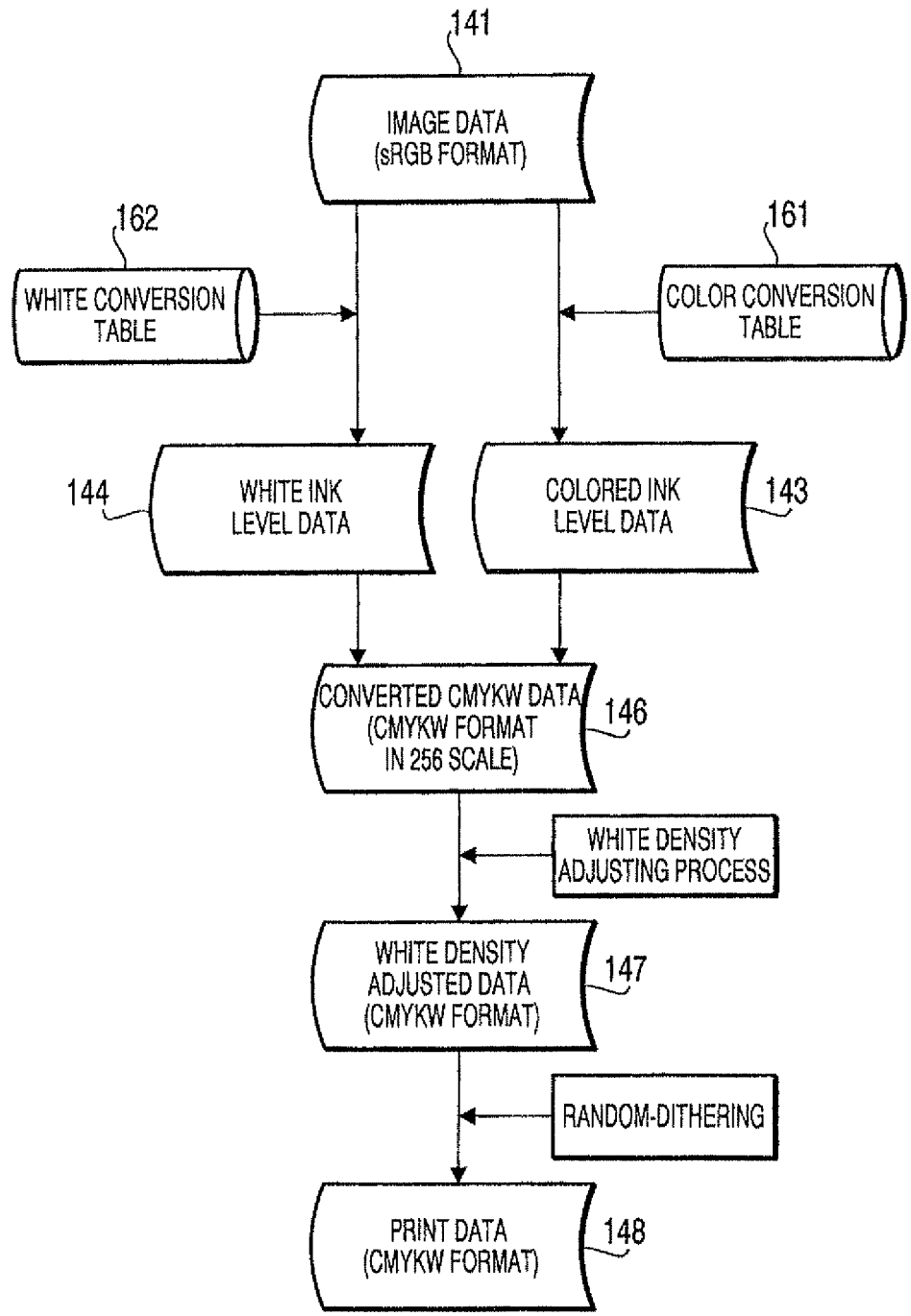
FIG. 6 illustrates transition of data in a print data generating process according to the first embodiment of the invention.
Figure 8:
FIG. 8 illustrates a data configuration of a white conversion table according to the first embodiment of the present invention.

Hereinafter, with reference to FIGS. 6-8, the data to be generated in the print data generating process according to the present embodiment will be described. FIG. 6 illustrates transition of data in the print data generating process according to the first embodiment of the invention. FIG. 7 illustrates a data configuration of the color conversion table 161 according to the first embodiment of the present invention. FIG. 8 illustrates a data configuration of the white conversion table 162 according to the first embodiment of the present invention.

As shown in FIG. 6, the print data 148 is generated based on the image data 141 stored in the inputted image data storing area 1121 in the RAM 112. The image data 141 is the data specified to be printed by the user among a plurality of pieces of image data which have been created by the user using various applications such as an application designed for editing graphics. Thus, the image data 141 is saved in the image data storing area 1165 of the HDD 116. Specifically, the image data according to the present embodiment is represented in 256 color scale of the image data in sRGB format. The sRGB is an international standard of color space established by the IEC (International Electrotechnical Commission), and various PC peripherals including digital cameras, printers, and monitors perform color adjustment according to the sRGB to minimize difference in colors between the inputted color and output color.

When an image is printed in a printing apparatus such as the inkjet printer 1 by ejecting the inks, a color of each pixel composing the image, represented in the sRGB format, is converted into CMYKW format to be CMYKW data 146. The CMYKW format is a method to reproduce a color in cyan (C), magenta (M), yellow (Y), black (K), and white (W). A color of each pixel is defined by combination of the C-scale value, M-scale value, Y-scale value, K-scale value, and W-scale value, which are respectively defined in 256 scales. When the image data 141 is converted into the CMYKW data 146, each of the C, M, Y, K-scale values are obtained based on the color conversion table 161. Additionally, the W-scale value representing a color of white is obtained based on the white conversion table 162.

The color conversion table 161 is a table for converting the input data in 256 color scales in the sRGB format into the output data in 256 color scales in the CMYK format, which is the format to represents the image in CMYK color scale values. As shown in FIG. 7, each of the CMYK scale values is defined to correspond to an sRGB scale value respectively. The sRGB scale values of each pixel which composes the image data 141 are converted into the corresponding CMYK scale values respectively based on the color conversion table 161. Thus, the image data 141 is converted in the colored ink level data 143 according to the color conversion table 161. The color conversion table 161 is created in a known method and stored preliminarily in the HDD 116. The color conversion table 161 is an example of a conversion table, which can be used to create print data to print an image on a black-colored recording medium.

The white conversion table 162 is a table for converting the input data in 256 color scale in the sRGB format into the output data in 256 color scales in W format. As shown in FIG. 8, the W value is defined to correspond to each of the sRGB values respectively. Further, the sRGB values of each pixel which composes the image data 141 are converted into the corresponding W value respectively based on the white conversion table 162. Thus, the image data 141 is converted into white ink level data 144 according to the white conversion table 162. The white conversion table 162 is created in a known method and stored preliminarily in the HDD 116. The CMYK scale values in the colored ink level data 143 and the W scale values in the white ink level data 144 are combined to be the converted CMYKW data 146 in 256 scales.

Figure 9:
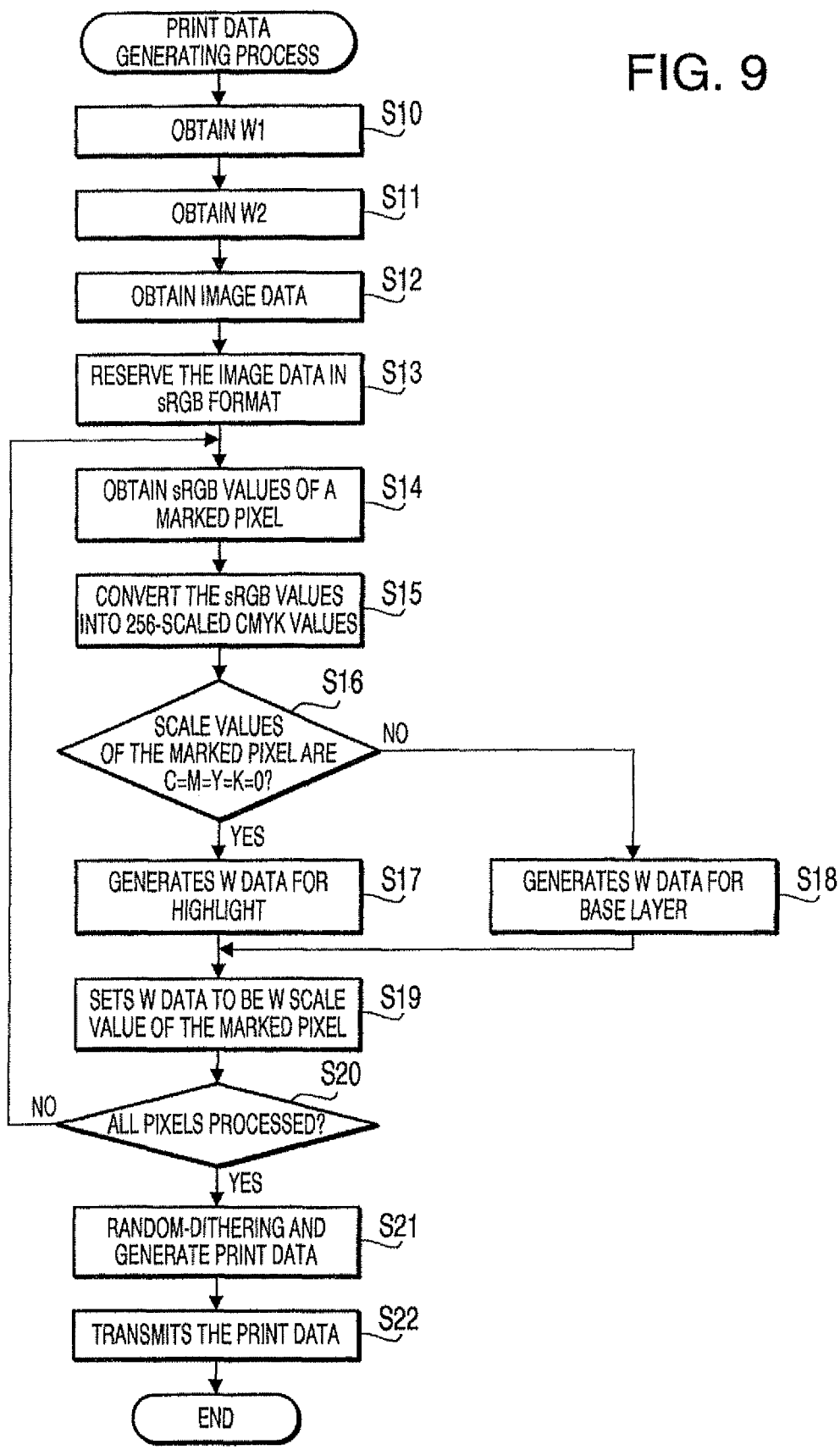
FIG. 9 is a flowchart to illustrate a print data generating process to be executed in the PC according to the first embodiment of the present invention.
Figure 10:
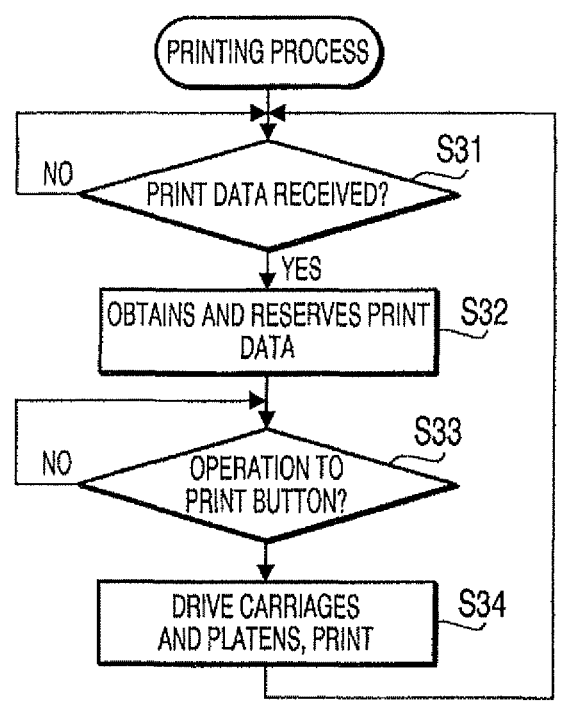
FIG. 10 is a flowchart of a printing process to be executed in the inkjet printer according to the first embodiment of the present invention.
Figure 11:
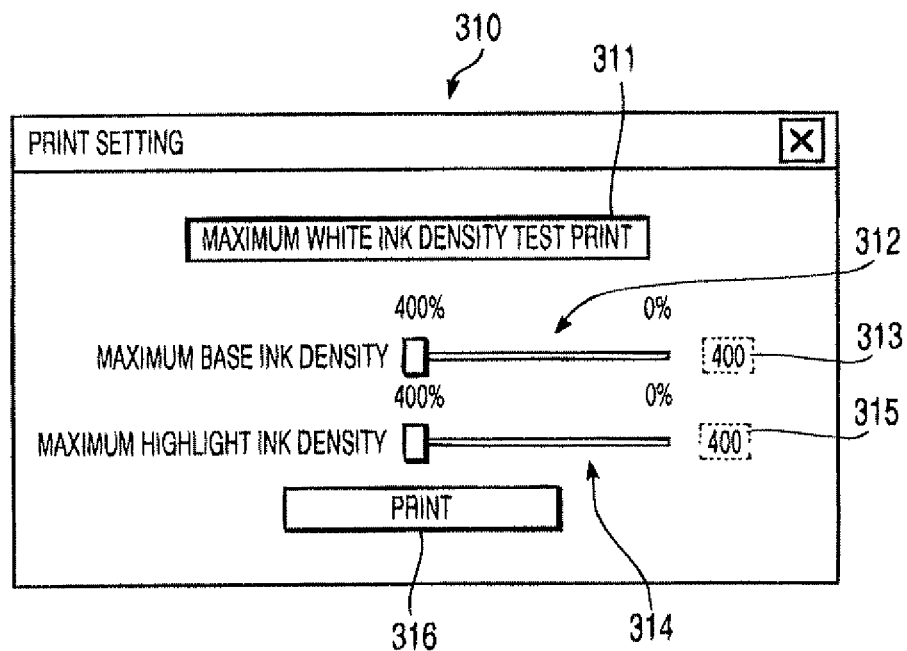
FIG. 11 illustrates a window to be displayed on a monitor screen of the PC according to the first embodiment of the present invention.
Figure 12:
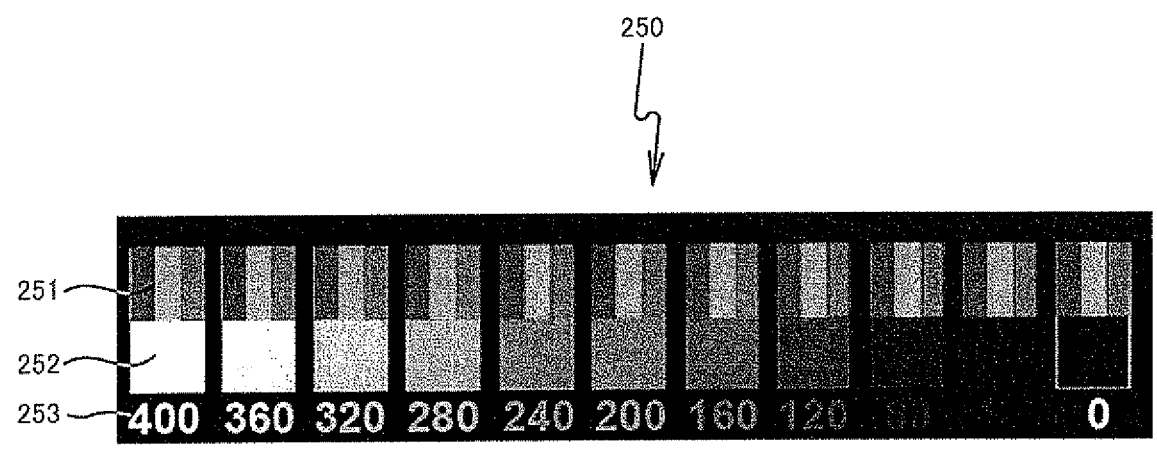
FIG. 12 illustrates a printed output of a test pattern according to the first embodiment of the present invention.
Figure 13:
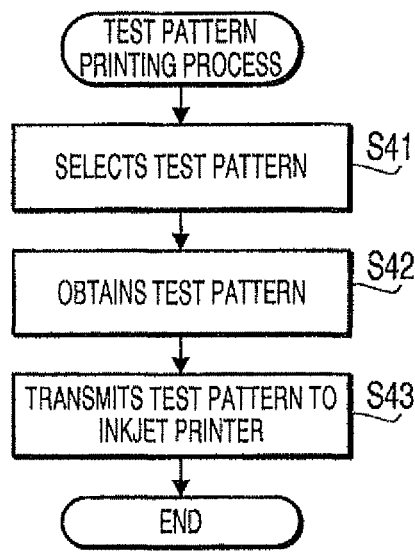
FIG. 13 is a flowchart of a test pattern printing process to be executed in the PC according to the first embodiment of the present invention.

Next, the print data generating process, a print test pattern and a test pattern printing process will be described with reference to FIGS. 9-13. FIG. 9 is a flowchart to illustrate the print data generating process to be executed in the PC 100 according to the first embodiment of the present invention, FIG. 10 is a flowchart of the printing process to be executed in the inkjet printer 1 according to the first embodiment of the present invention. FIG. 11 illustrates a setting window to be displayed on a monitor screen of the PC 100 according to the first embodiment of the present invention. FIG. 12 illustrates a printed output of a test pattern according to the first embodiment of the present invention. FIG. 13 is a flowchart of the test pattern printing process to be executed in the PC 100 according to the first embodiment of the present invention.

A print setting window 310 to be displayed on the screen of the monitor 133 will be described with reference to FIG. 11. The print setting window 310 includes a test print button 311, a maximum base ink density adjuster 312, a maximum base ink density indicator field 313, a maximum highlight ink density adjuster 314, a maximum highlight ink density indicator field 315, and a print button 316.

The maximum base ink density adjuster 312 is an adjuster knob to designate a maximum density of the white ink to be used to form a base layer on which a colored image is formed. The maximum density of the white ink set in the print setting window 310 will be hereinafter referred to as a maximum base ink density (W1). The maximum highlight ink density adjuster 314 is an adjuster knob to designate a maximum density of the white ink to be used to form a highlight portion of the image. The maximum density of the white ink set in the print setting window 310 will be hereinafter referred to as a maximum highlight ink density (W2). In the present embodiment, a density of white pixels which can be formed by one of the four inkjet heads 11-14 being driven in the main scanning direction for one line is defined to be 100%. Because the inkjet heads 11-14 are configured to eject the white ink, when the four inkjet heads 11-14 are operated to eject the white ink in full (100%) dischargeable density respectively, a maximum capable density of 400% can be achieved. Thus, the maximum base ink density and the maximum highlight ink density within a range 0%-400% can be set respectively by sliding motions of the maximum base ink density adjuster 312 and the maximum highlight ink density adjuster 314.

Values set by the maximum base ink density adjuster 312 and the maximum highlight ink density adjuster 314 are indicated in the maximum base ink density indicator field 313 and the maximum highlight ink density indicator field 315 respectively. The maximum base ink density indicator field 313 and the maximum highlight ink density indicator field 315 are configured not to accept a user's input through the keyboard 135 or other input devices.

The print button 316 is a button to be pressed by the user to provide an instruction to the PC 100 and the inkjet printer 1 to start printing an image according to print data in which the white densities are adjusted. The test print button 311 is a button to be pressed by the user to provide an instruction to the PC 100 and the inkjet printer 1 to start printing a test pattern, in which the white densities are varied in scales, on the recording medium.

With reference to FIG. 12, a test pattern 250 to be printed on the recording medium according to the embodiment of the present invention will be described. The test pattern 250 in FIG. 12 includes colored areas 251, highlight areas 252, and density indexes 253. Each of the colored areas 251 is formed with a base layer in white ink and an upper layer formed in predetermined colored inks over the base layer. Each of the highlight areas 252 is formed solely in the white ink, and no colored inks are provided over the areas 252 (i.e., substantially the base layer only). The density indexes 253 are values which indicate densities of white of the base layers. In the present embodiment, each upper layer of the colored areas including a red area, a yellow area, and a blue area, formed respectively in colored inks red, yellow, and blue, is formed over the base layer in each base area 251. The red area is formed in 100% of the C ink, 0% of the M ink, 100% of the Y ink, and 0% of the KC ink. The yellow area is formed in 0% of the C ink, 0% of the M ink, 100% of the Y ink, and 0% of the K ink. The blue area is formed in 100% of the C ink, 100% of the M ink, 0% of the Y ink, and 0% of the K ink. Therefore, the user can view appearances of the colored inks over the base layers in the colored areas 251 and the highlight white inks in the highlight areas 252 in the test pattern 250.

The density indexes 253 include values which indicate the white densities. A white density of a rightmost area in the test pattern 250, in which no white ink is provided, is defined to be 0%. A leftmost area in the test pattern 250, in which the white ink is provided in the maximum capable density (i.e., 400%), is indicated by a value "400." The areas ranging in between the rightmost area and the leftmost area are formed in transient white densities, which are incremented by 40%. The highlight areas 252 are formed in white ink in the white densities respectively indicated by the density indexes 253. The upper layers of the colored areas 251 are formed over the base layer formed in the white densities respectively indicated by the density indexes 253.

Data representing the test pattern 250 is preliminarily prepared and stored in the HID 116 of the PC 100. When the recording medium is set in the inkjet printer 1, and when the user operates the test print button 311 in the print setting window 310, a printing operation to print the test pattern 250 is performed. The user can thus view the white densities of the highlight areas 252 in the test pattern 250 prior to printing the print data 148 on the recording medium so that the maximum base ink density and the maximum highlight ink density can be adjusted based on the test pattern 250 through the print setting window 310.

Next, with reference to FIGS. 9-11, a series of behaviors of the PC 100 to perform the print data generating process will be described. The series of behaviors is started when the print button 316 in the print setting window 310 is pressed and the printer driver in the PC 100 is activated. When the printer driver is activated, CPU 110 starts the print data generating process according to a print data generating program.

When the print data generating process is started, as shown in FIG. 9, in S10, the maximum base ink density (W1) entered through the print setting window 310 is obtained. The obtained maximum base ink density (W1) is reserved in the maximum white ink density storing area 1125 of the RAM 112. In S11, the maximum highlight ink density (W2) entered through the print setting window 310 is obtained and reserved in the maximum white ink density storing area 11 25 of the RAM 112. In Si 2, the image data 141 in the sRGB format to be printed is obtained from the image data storing area 1165 of the HDD 116. In S13, the obtained image data 141 is reserved in the inputted image data storing area 1121 of the RAM 112.

In S14, one of pixels which compose the image data 141 is targeted as a currently marked pixel, and the sRGB values of the marked pixel are obtained. In S15, the image data 141 in the sRGB format reserved in the inputted image data storing area 1121 is converted into CMYKW format to be converted CMYKW data 146. Specifically, the ROB values in the image data 141 are converted into the colored ink level data 143 and the white ink level data 144 according to the color conversion table 161 and the white conversion table 162 and into the converted CMYKW data 146. The converted CMYKW data is reserved in the converted CMYKW data storing area 1122 of the RAM 112.

In S16, the scale values of the C, M, Y and K of the marked pixel are examined. Specifically, it is examined as to whether all of the C, M, Y, K scale values are zero. If the C, M, Y, K scale values are zero(C=M=Y=K=0) (S16; YES), it is determined that the marked pixel is to be painted in white in order to form a white area being highlight, rather than to form a base layer. In S17, a process to generate the W data for highlight is performed. In S17, with the scale value of white of the marked pixel being W0, the maximum highlight ink density being W2, the maximum capable density being Wmax, the W data of the marked pixel for highlight is obtained by W0 multiplied by W2 divided by Wmax (W=W0×W2/Wmax). Thus, the W data of the marked pixel, in which the scale value is adjusted for highlight, is obtained.

When the maximum highlight ink density (W2) is set to be equal to a value of the maximum capable density (Wmax), the W data for the marked pixel for highlight remains unchanged. When the maximum highlight ink density (W2) is decremented to be smaller, the W scale value of the marked pixel (W0) becomes closer to 0 (zero). Thus, the W scale value of the marked pixel (W0) can be adjusted to be smaller than or equal to the maximum capable density.

In S16, if all of the C, M, Y, K scale values are not zero (S16: NO), it is determined as to whether the marked pixel is a pixel to compose a base layer. In S18, a process to generate W data for a base layer is performed. In S18, with the scale value of white of the marked pixel being W1, the W data of the marked pixel for a base layer is obtained by W0 multiplied by W1 divided by Wmax (W=W0×W1/Wmax). Thus, the W data of the marked pixel, in which the scale value is adjusted for a base layer, is obtained. Therefore, the W scale value of the marked pixel (W0) for a base layer can be adjusted to be smaller than or equal to the maximum capable density.

Next, in S19, the obtained W data is set to be the W scale value of the marked pixel and reserved in the white density adjusted data storing area 1123 to be the white density adjusted data 147.

In S20, it is examined as to whether the above steps S14-S19 are applied to all the pixels included in the image data 141. If a pixel remains unprocessed (S20: NO), the process returns to S14, and a next pixel is targeted as a marked pixel. If all the pixels are processed (S20: YES), in S21, a known random dithering process is applied to the white density adjusted data 147. Thus, print data 148, in which a color of each pixel therein is binarized (indication as to whether each of the CMYKW inks is ejected or not ejected), is created. In 822, the created print data 148 is transmitted to the inkjet printer 1. Thus, a printing process, in which the print data 148 including information concerning the image is used to form the image on the recording medium, is performed in the inkjet printer 1. The printing process will be described later in detail. The print data generating process is terminated thereafter Next, with reference to FIG. 10, a printing process to print the print data 148 will be described. It is to be noted that, although it is not included in the flow, the user is required to set the recording medium on the platen 5 of the recording medium prior to the printing process.

The printing process shown in FIG. 10 is initiated when the inkjet printer 1 is powered on. When the printing process starts, in S31, it is examined as to whether the print data 148 from the PC 100 has been received. If the print data 148 has not been received (S31: NO), 831 is repeated. When the print data 148 transmitted from the PC 100 (in S22 of FIG. 9) is received (S31: YES), in S32, the print data 148 is reserved in a print data storing area (not shown) in the RAM 62. Further, the data reception indicator 57 is switched on.

Thereafter, in S33, it is examined as to whether the print button 52 has been operated. If the print button 52 has not been operated (S33: NO), S33 is repeated. When the print button 52 is operated (833; YES), in 834, the print data 148 in the print data storing area in the RAM 62 is obtained. Further, the first and the second carriages 10, 20 are driven in the main scanning direction, and the platen 5 is driven in the auxiliary direction so that the recording medium is moved to a printable position. Thereafter, the inks are ejected from the inkjet heads 11-14 mounted on the first carriage 10 and the inkjet heads 21-24 mounted on the second carriage 20 according to the print data 148 to form the image on the recording medium. When image forming is completed, the printing process is terminated.

Next, with reference to FIG. 13, a test pattern printing process to be executed in the inkjet printer 1 will be described. It is to be noted that, although it is not included in the flow, the user is required to set the recording medium on the platen 5 of the recording medium prior to the test pattern printing process.

When the test print button 311 in the print setting window 310 is operated, the test pattern printing process is started. In S41, a test pattern corresponding to the button being operated is selected. In the present embodiment, the predetermined test pattern 250 is selected to be printed. In S42, data representing the test pattern 250 stored in the test pattern storing area 1166 of the HDD 116 is obtained. In S43, the data representing the test pattern 250 is transmitted to the inkjet printer 1. The inkjet printer 1 receiving the data executes the printing process (see FIG. 10) to print the test pattern 250.

As has been described above, according to the embodiment, the maximum base ink density, which is a density of white to be used to form a base layer, and the maximum highlight ink density, which is to a density of white to be used to form a highlight portion, can be determined in the PC 100. According to the maximum base ink density and the maximum highlight ink density, a white density of a marked pixel, which is one of pixels composing the image data, is adjusted. The above process is applied to all the pixels included in the image data so that the image data applied the above process is converted into the print data, in which the white densities are adjusted. After the random-dithering process, the print data is passed to the inkjet printer 1, which drives the inkjet heads 11-14 and 21-24 to form the image according to the print data. Further, according to the test pattern printing process, the test pattern 250, in which the white densities are varied in steps, is printed on the recording medium.

Therefore, when the user enters preferable densities for the white ink, the print data, by which the densities of the white ink are adjusted, can be generated. In this regard, preferable densities for the white ink in consideration of, for example, materials and textures of the recording media can be entered. Further, the printed test pattern 250 enables the user to recognize various patterns of white, of which densities are varied, so that the user can determine preferable densities for the base layer and the highlight areas. Therefore, overuse of the white ink can be avoided, and cost for printing can be reduced.

Figure 14:
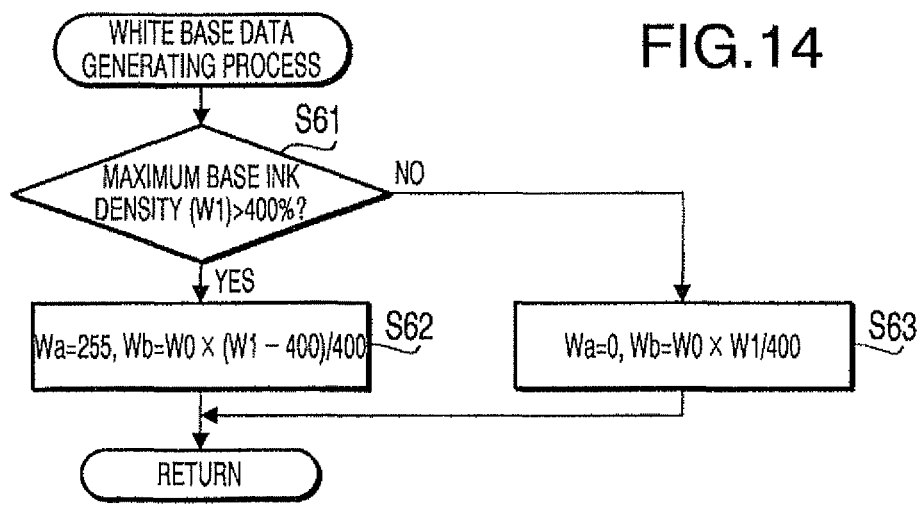
FIG. 14 is a flowchart to illustrate a white base data generating process to be executed in the PC according to a second embodiment of the present invention.
Figure 15:
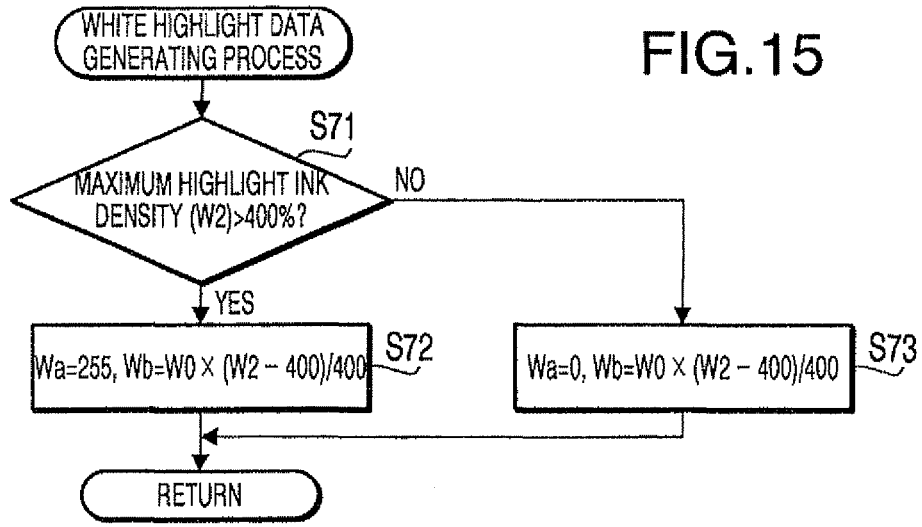
FIG. 15 is a flowchart to illustrate a white highlight data generating process to be executed in the PC according to the second embodiment of the present invention.
Figure 16:
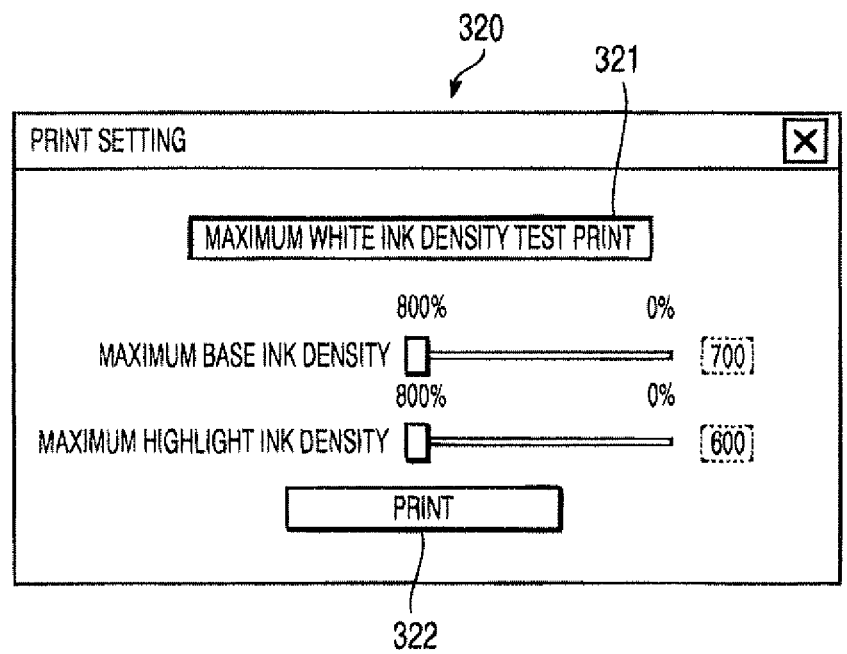
FIG. 16 illustrates a window to be displayed on a monitor screen of the PC according to the second embodiment of the present invention.
Figure 17:
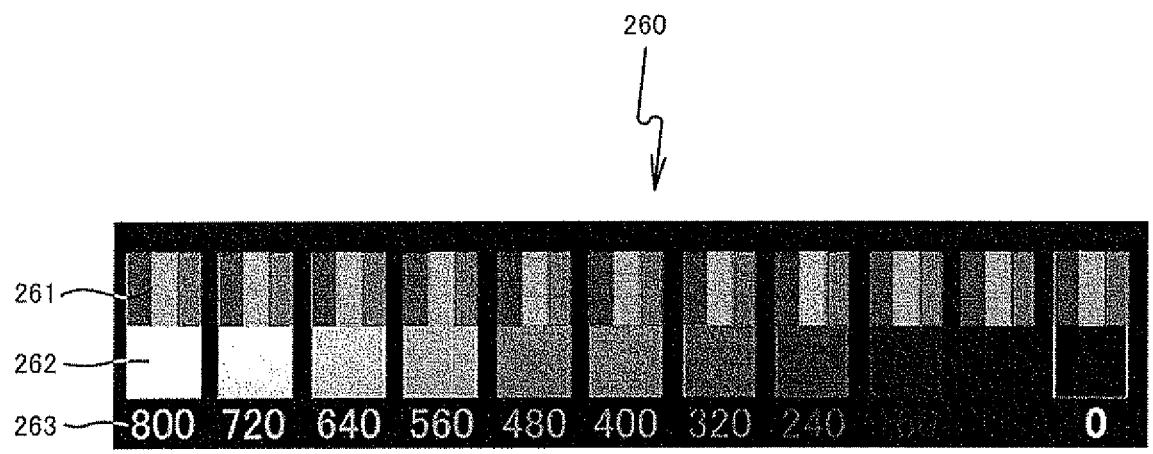
FIG. 17 illustrates a printed output of a test pattern according to the second embodiment of the present invention.

Next, with reference to FIGS. 9, 14-17, a second embodiment of the present invention will be described. FIG. 14 is a flowchart to illustrate a white base data generating process to be executed in a PC 200 according to the second embodiment of the present invention. FIG. 15 is a flowchart to illustrate a white highlight data generating process to be executed in the PC 200 according to the second embodiment of the present invention. FIG. 16 illustrates a window to be displayed on a monitor screen of the PC 200 according to the second embodiment of the present invention. FIG. 17 illustrates a printed output of a test pattern 260 according to the second embodiment of the present invention.

The PC 200 according to the second embodiment is configured to be similar to the PC 100 in the first embodiment but different in that the maximum base ink density and the maximum highlight ink density can be greater than the maximum capable density. The PC 200 can behave similarly to the PC 100 in the print data generating process in the first embodiment except behaviors shown in FIGS. 14 and 15. Therefore, structures and behaviors similar to those of the PC 100 will be referred to by identical reference numerals, and description of those will be omitted.

A print setting window 320 to be displayed on the screen of the monitor 133 according to the second embodiment will be described. As shown in FIG. 16, the print setting window 320 is designed to accept the white densities for the maximum base ink density and the maximum highlight ink density to be greater than the maximum capable density between a range from 0% to 800%. When a value greater than 400% is set for the maximum base ink density or the maximum highlight ink density, the inkjet heads 11-14 for white ink are reciprocated twice over one line in the main scanning direction to eject the white ink. Thus, the white density being greater than the maximum capable density (i.e., 400%) can be achieved.

Next, with reference to FIG. 17, a test pattern 260 to be printed on the recording medium according to the embodiment of the present invention will be described. The test pattern 260 in FIG. 17 is printed on the recording medium when the test print button 321 is operated through the print setting window 320. The test pattern 260 includes colored areas 261, highlight areas 262, and density indexes 263. The areas ranging in between the rightmost area and the leftmost area are formed in transient white densities, which are incremented by 80%. A white density of the rightmost area in the test pattern 260 is defined to be 0%, and the leftmost area in the test pattern 260, in which the white ink is provided in the maximum capable density (i.e., 800%), is indicated by a value "800." The highlight areas 262 are formed in white ink in the white densities respectively indicated by the density indexes 263. The upper layers of the colored areas 261 are formed over the base layer formed in the white densities respectively indicated by the density indexes 263.

With reference to FIGS. 14-16, behaviors of the PC 200 in a W data for base layer generating process and a W data for highlight generating process will be described. The W data generating processes are included in the print data generating process described in the first embodiment and start in S18 and S17 (see FIG. 9) respectively in the print data generating process.

The W data for base layer generating process is illustrated in FIG. 14. In the W data for base layer generating process, the W data of the marked pixel includes first W data (Wa) and second W data (Wb). The first W data (Wa) indicates a scale value (i.e., density) of W of the marked pixel to be formed on the recording medium in the first run of the inkjet heads 11-14. The second W data (Wb) indicates a scale value (i.e., density) of W of the marked pixel to be formed on the recording medium in the second run of the inkjet heads 11-14.

When the W data for base layer generating process starts, in S61, it is examined as to whether the maximum base ink density (W1) reserved in the maximum white ink density storing area 1125 of the RAM 112 is greater than 400%, which is the maximum capable density. When the maximum base ink density (W1) is greater than 400% (S61: YES), in S62, the first W data is set to be 255 (Wa=255), and the second W data is calculated to be W0 multiplied by (W1 minus 400) divided by 400 (Wb=W0×(W1−400)/400) while W0 is a scale value of W of the marked pixel.

Thus, the first W data (Wa) indicating a density of W of the pixel to be formed in the first run is set to be the maximum capable density (ice., 400%). Meanwhile, the second W data (Wb) indicating a density of W of the same pixel to be formed in the second run is determined by obtaining a ratio of a value being the maximum base ink density minus maximum capable density with respect to the maximum capable density, and the W scale value of the marked pixel being multiplied by the ratio. Upon completion of S62, the W data for base layer generating process is terminated, and the process returns to S19 in FIG. 9. Thereafter, the obtained Wa and Wb become the W scale values of the marked pixel to be the white density adjusted data 147 in CMYKWaWb format and reserved in the white density adjusted data storing area 1123.

In S61, if the maximum base ink density (W1) is smaller than or equal to 400% (S61: NO), in S63, the first W data is set to be zero (Wa=0), and the second W data is calculated to be W0 multiplied by W1 divided by 400 (Wb=W0×W1/400).

Thus, the first W data (Wa) indicating a density of W of the pixel to be formed in the first run is set to be zero. Meanwhile, the second W data (Wb) indicating a density of W of the same pixel to be formed in the second run is determined by obtaining a ratio of the maximum base ink density with respect to the maximum capable density multiplied by the W scale value of the marked pixel. Upon completion of S63, the W data for base layer generating process is terminated, and the process returns to S19 in FIG. 9. Thereafter, the obtained Wa and Wb become the W scale values of the marked pixel to be the white density adjusted data in CMYKWaWb format and reserved in the white density adjusted data storing area 1123.

Next, with reference to FIG. 15, the W data for highlight generating process will be described. In the W data for highlight generating process, the W data of the marked pixel includes first W data (Wa) and second W data (Wb). The first W data (Wa) indicates a scale value (i.e., density) of W of the marked pixel to be formed on the recording medium in the first run of the inkjet heads 11-14. The second W data (Wb) indicates a scale value (i.e., density) of W of the marked pixel to be formed on the recording medium in the second run of the inkjet heads 11-14.

When the W data for highlight generating process starts, in S71, it is examined as to whether the maximum highlight ink density (W2) reserved in the maximum white ink density storing area 1125 of the RAM 112 is greater than 400%, which is the maximum capable density. When the maximum highlight ink density (W2) is greater than 400% (S71: YES), in S72, the first W data is set to be 255 (Wa=255), and the second W data is calculated to be W0 multiplied by (W2 minus 400) divided by 400 (Wb=W0×(W2−400)/400) while W0 is a scale value of W of the marked pixel.

Thus, the first W data (Wa) indicating a density of W of the pixel to be formed in the first run is set to be the maximum capable density (i.e., 400%). Meanwhile, the second W data (Wb) indicating a density of W of the same pixel to be formed in the second run is determined by obtaining a ratio of a value being the maximum base ink density minus maximum capable density with respect to the maximum capable density, and the W scale value of the marked pixel being multiplied by the ratio. Upon completion of S72, the W data for highlight generating process is terminated, and the process returns to S19 in FIG. 9. Thereafter, the obtained Wa and WE become the W scale values of the marked pixel to be the white density adjusted data 147 in CMYKWaWb format and reserved in the white density adjusted data storing area 1123.

In S71, when the maximum highlight ink density (W2) reserved in the maximum white ink density storing area 1125 is not greater than 400% (S71: NO), in S73, the first W data is set to be zero (Wa=0), and the second W data is calculated to be W0 multiplied by W2 divided by 400 (Wb=W0×W2/400) while W0 is a scale value of W of the marked pixel. Thus, the first W data (Wa) indicating a density of W of the pixel to be formed in the first run is set to be 0. Meanwhile, the second W data (Wb) indicating a density of W of the same pixel to be formed in the second run is determined by obtaining a ratio of a value being the maximum highlight ink density with respect to the maximum capable density multiplied by the scale value of W of the marked pixel. Upon completion of S73, the W data for highlight generating process is terminated, and the process returns to S19 in FIG. 9. Thereafter, the obtained Wa and Wb become the W scale values of the marked pixel to be the white density adjusted data 147 in CMYKWaWb format and reserved in the white density adjusted data storing area 1123.

The process returns to S19 in FIG. 9. The white density adjusted data 147 is processed in the random-dithering method in S21 to be the print data 148, which is transmitted to the inkjet printer 1 in S22.

When the print data 148 is received in the inkjet printer 1, the printing process (see FIG. 10) is performed similarly as described in the first embodiment. In S34, however, when the first carriage 10 with the inkjet heads 11-14 is driven, the first carriage 10 is run twice over a same line in the main scramming direction. Namely, in the first run, the line is formed according to the first W data (Wa), and the line is formed according to the second W data (Wb).

Behaviors of the inkjet printer 1 to print the test pattern 260 is similar to those to print the test pattern 250; therefore, description of those will be omitted.

As has been described above, according to the second embodiment, the maximum base ink density and the maximum highlight ink density can be set to be greater than the maximum capable density. According to such densities greater than the maximum capable density, more dense white can be reproduced on the recording medium.

In the second embodiment, the print data is in the CMYK-WaWb format, which represents that the inkjet heads 11-14 are run twice over a same line. It is to be noted that the number of times to run the inkjet heads is not limited to two, but the inkjet heads 11-14 may be run for n times. In such a configuration, W data (Wa-Wn) is generated. In this regard, W data for Wa through W(n-1) is set to be 255 (i.e., maximum capable density), and Wn is calculated to have the W scale value being adjusted by the maximum base ink density or the maximum highlight ink density.

Figure 18:
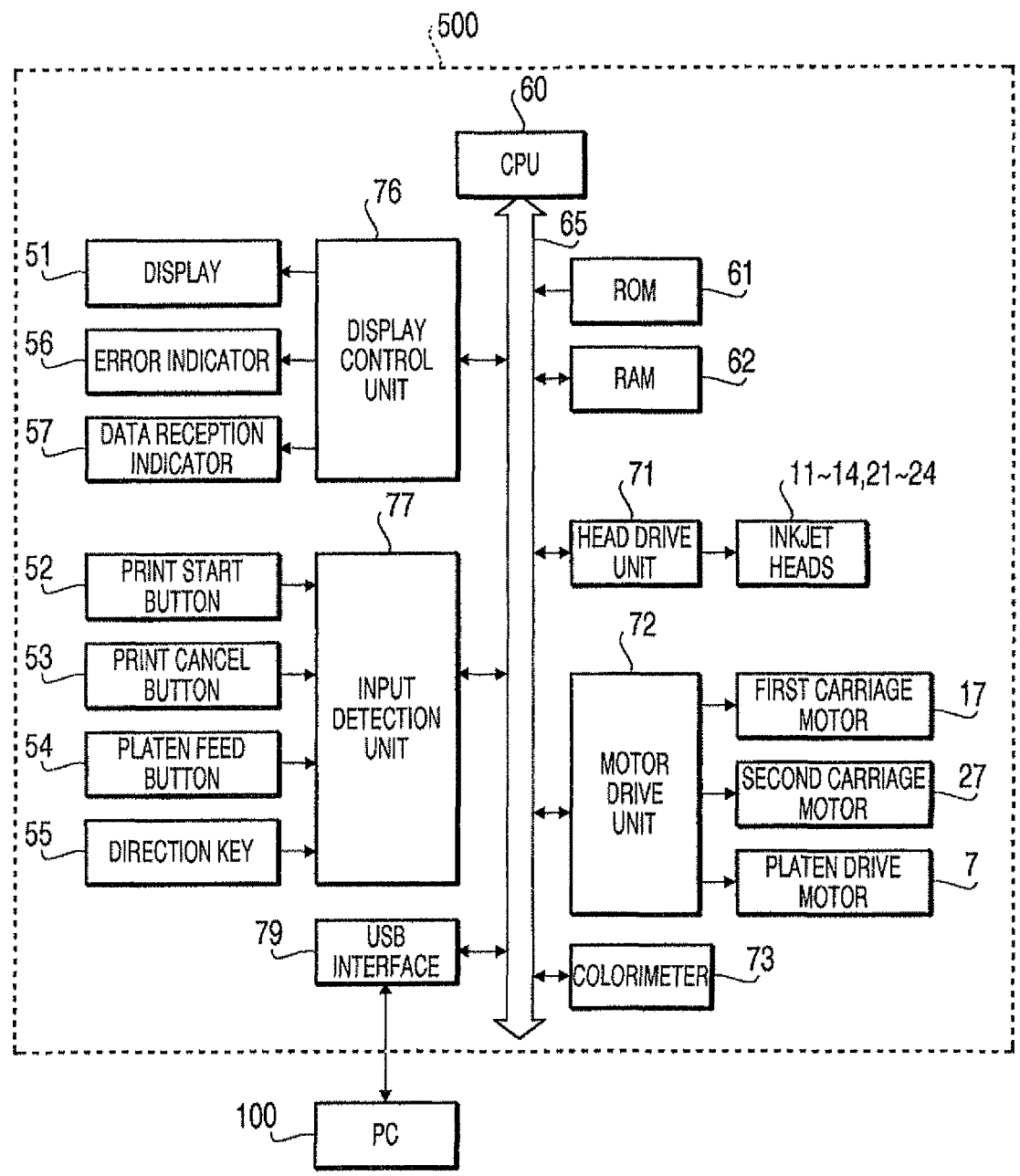
FIG. 18 is a block diagram to illustrate an electrical configuration of the inkjet printer according to a third embodiment of the present invention.
Figures 19, 20:
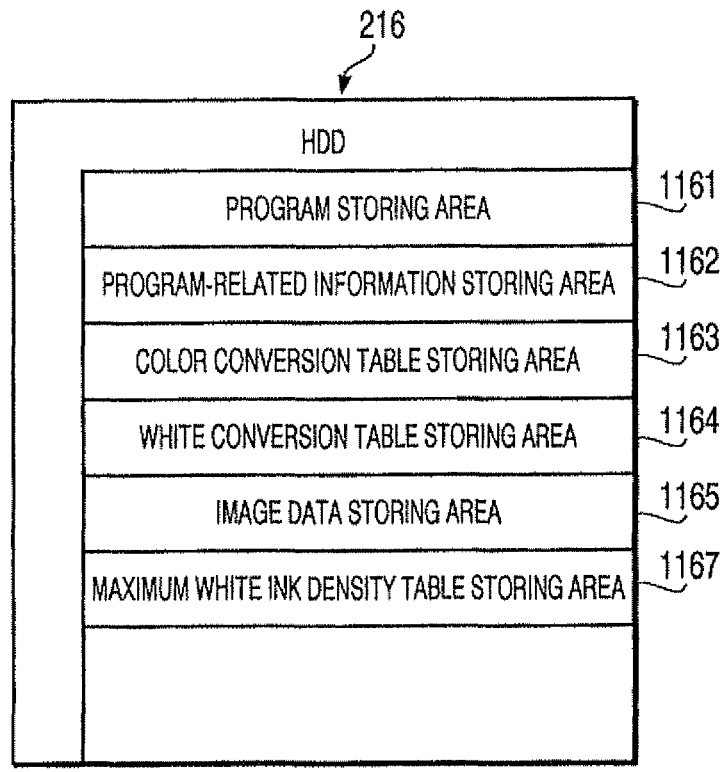
FIG. 19 is a schematic diagram of an HDD in the PC according to the third embodiment of the invention.
FIG. 20 illustrates a maximum white ink density table according to the third embodiment of the present invention.
Figure 21:
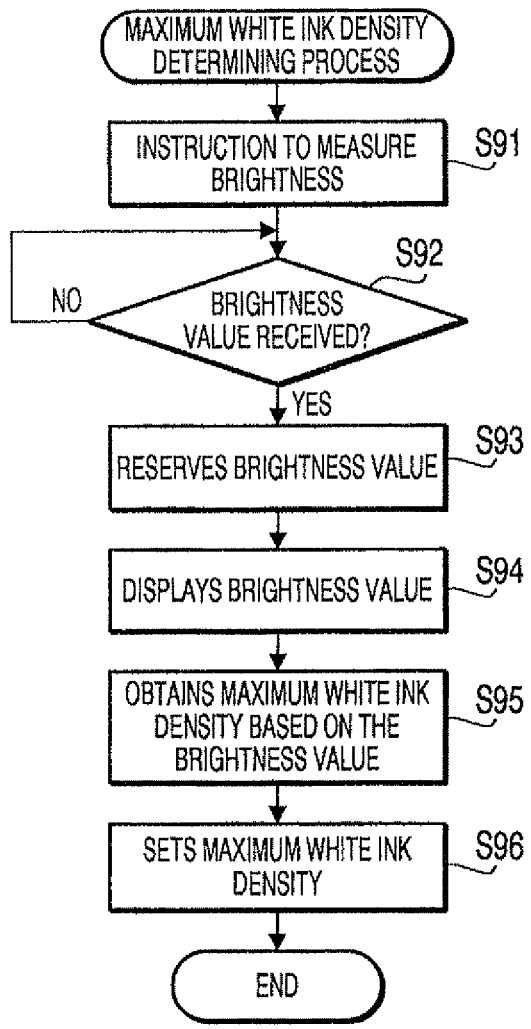
FIG. 21 is a flowchart to illustrate a maximum white ink density determining process to be executed in the PC according to the third embodiment of the present invention.
Figure 22:
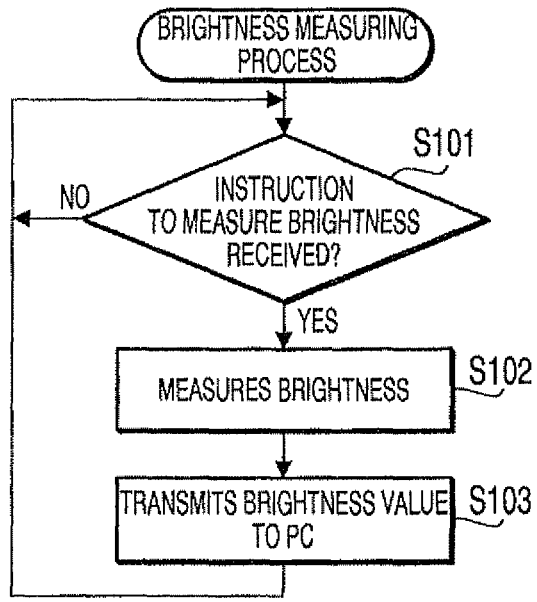
FIG. 22 is a flowchart to illustrate a brightness measuring process to be executed in the inkjet printer according to the third, embodiment of the present invention.
Figure 23:
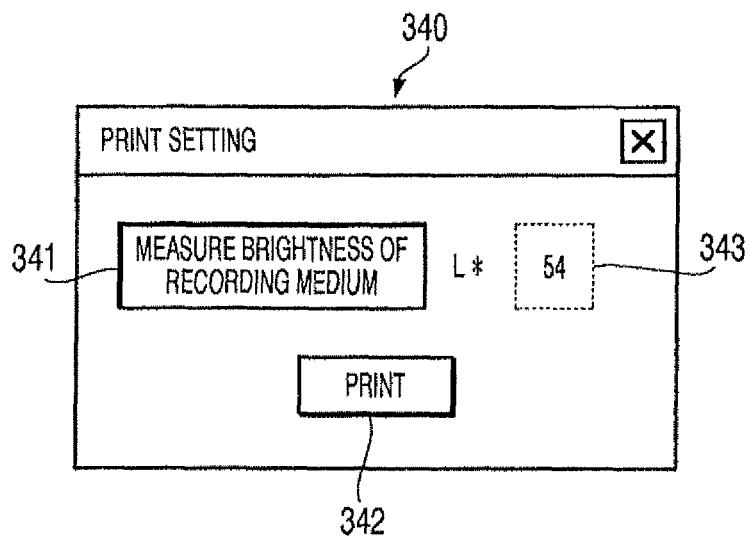
FIG. 23 illustrates a window to be displayed on the monitor screen of the PC according to the third embodiment of the present invention.

Next, a third embodiment of the present invention will be described with reference to FIGS. 18-23. FIG. 18 is a block diagram to illustrate an electrical configuration of an inkjet printer 500 according to the third embodiment of the present invention. FIG. 19 is a schematic diagram of an HDD 216 in a PC 300 according to the third embodiment of the invention. FIG. 20 illustrates a maximum white ink density table 210 according to the third embodiment of the present invention, FIG. 21 is a flowchart to illustrate a maximum white ink density determining process to be executed in the PC300 according to the third embodiment of the present invention. FIG. 22 is a flowchart to illustrate a brightness measuring process to be executed in the inkjet printer 500 according to the third embodiment of the present invention. FIG. 23 illustrates a window to be displayed on the monitor screen of the PC 300 according to the third embodiment of the present invention.

The PC 300 according to the third embodiment is configured to be similar to the PC 100 in the first embodiment, and the inkjet printer 500 is configured to be similar to the inkjet printer 1 in the first embodiment, but different in that the PC 300 instructs the inkjet printer 500 to measure brightness (L* value) on a printable surface of the recording medium and receives a measured brightness transmitted from the inkjet printer 500. Accordingly, the PC 300 can set the maximum white ink density based on the received brightness of the recording medium.

As shown in FIG. 18, the inkjet printer 500 is equipped with a calorimeter 73 to measure brightness of the printable surface of the recording medium. The colorimeter 73 is a known spectrophotometric colorimeter and connected to the CPU 60 through the bus 65. The PC 300 is configured to behave similarly to the PC 100 except the maximum white ink density determining process shown in FIG. 21. The inkjet printer 500 behaves similarly to the inkjet printer 1 in the first embodiment except the brightness measuring process shown in FIG. 22. Therefore, structures and behaviors similar to those of the PC 100 and the inkjet printer 1 will be referred to by identical reference numerals, and description of those will be omitted.

A print setting window 340 to be displayed on the screen of the monitor 133 will be described with reference to FIG. 23. The print setting window 340 includes a print button 342, a color measurement button 341, and a brightness indicator field 343. The print button 342 is operated when a printing operation according the print data, in which the white densities are adjusted, is performed. When the recording medium is set in the inkjet printer 500, and the color measurement button 341 is operated, the inkjet printer 500 measures brightness of the printable surface of the recording medium by the colorimeter 73. The brightness value obtained by the measurement is displayed in the brightness indicator field 343. In the present embodiment, the brightness value displayed in the brightness indicator field 343 is configured not to be altered by the user's input through the keyboard 135 or other input devices.

The PC 300 is equipped with an HDD 216, which additionally includes a maximum white ink density table storing area 1167. The maximum white ink density table storing area 1167 stores a maximum white ink density table 210 (FIG. 20). The maximum white ink density table 210 is a table to define correspondence between the maximum white ink densities of the white ink to be used and the brightness values. As shown in FIG. 20, the L* values indicating brightness in a plurality of ranges are set in a brightness column 211, and the maximum white ink densities corresponding to the ranges are set in a maximum white ink density column 212. In the present embodiment, 100% of the maximum white ink density corresponds to the maximum capable density of each of the inkjet heads 11-14. A density of the maximum white ink to be ejected from the inkjet heads 11-14, ranging from 0% to 400%, is determined based on the L* values.

With reference to FIG. 21, the maximum white ink density determining process will be described. The process starts when the color measurement button 341 in the print setting window 340 is operated. When the maximum white ink density determining process starts, in S91, instruction signals to instruct the inkjet printer 500 to measure brightness of the printable surface of the recording medium are transmitted to the inkjet printer 500. According to the instruction signals, the inkjet printer 500 measures brightness of the printable surface of the recording medium and transmits the measured brightness to the PC 300. In S92, it is examined as to whether the brightness value transmitted from the inkjet printer 500 is received in the PC 300. The process to measure brightness will be described later in detail.

In S92, if no brightness value is received (S92: NO), S92 is repeated. If the brightness value is received (S92: YES), in S93, the brightness value is reserved. In S94, the reserved brightness value is displayed in the brightness indicator field 343 in the print setting window 340. In S95, the maximum white ink density is obtained based on the reserved brightness value with reference to the maximum white ink density table 210. In S96, the obtained maximum white ink density is reserved in the maximum white ink density storing area 1125 of the RAM 112.

Next, with reference to FIG. 22, the brightness measuring process in the inkjet printer 500 will be described. The process is started when the inkjet printer 500 is powered on. In S101, it is examined as to whether the instruction signals from the PC 300 to instruct measuring brightness are received. If no instruction signal is received (S101: NO), S101 is repeated. If the instruction signals are received (S101: YES), in S102, the colorimeter 73 is activated to measure brightness of the printable surface of the recording medium according to the instruction signals. In S103, a brightness value obtained by the measurement is transmitted to the PC 300. The process returns to S101.

When the print button 342 in the print setting window 340 is operated, the print data generating process (FIG. 9) as described in the first embodiment is executed. In this process, the maximum white ink density reserved in the maximum white ink density storing area 1125 in S96 (FIG. 21) is used. Further, the maximum base ink density and the maximum highlight ink density are set to be equivalent in the print data generating process according to the third embodiment.

As has been described above, according to the third embodiment, the brightness of the printable surface of the recording medium can be obtained, and a preferable density of the white ink can be determined based on the brightness without having the test patterns printed on the recording medium for the user to view.

Although examples of carrying out the invention have been described, those skilled in the art will appreciate that there are numerous variations and permutations of the print data generating device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the embodiments described above, the color conversion table 161 and the white conversion table 162 are used for converting image data in the sRGB format into print data in the CMYKW format, however, different data formats may be arbitrarily selected. For example, the image data 141 may be data on the other color space such as the CMYK format and the HSV format, and the print data 148 may be data in the other color space such the ROB format and the HSV format depending on the recording method of the printer being used. In addition, the color conversion table 161 and the white conversion table 162 may be modified as long as correspondence of data format is defined so that the image data 141 and the print data 148 are convertible. Further, the color scales of the data may not be limited to 256.

For another example, the method to generate the print data 148 from the white density adjusted data 147 is not limited to the random-dithering, but may be, for example, a known threshold method. In the threshold method, the white density adjusted 147 can be converted into the CMYKW format in a binary-format, which indicates as to whether the inks are to be ejected or not ejected, based on the threshold.

The inkjet printer 1 may be, for example, equipped with a single carriage in place of the first and the second carriages 10, 20, on which five inkjet heads for C, M, Y, K, W inks are mounted. For another example, the inkjet printer may not necessarily be equipped with the inkjet head to eject K ink.

Further, in the above embodiments, the inkjet printer 1 is configured to drive the platen 5 in the auxiliary direction and the first and the second carriages 10, 20 in the main scanning direction in order to move the recording medium in the printable position. However, the platen 5 may be fixed to one position, while the first and the second carniages 10, 20 are driven in the auxiliary direction and the main scanning direction. In reverse, the first and the second carriages 10, 20 may be fixed, while the platen 5 is moved in the auxiliary direction and the main scanning direction.

Figure 24:
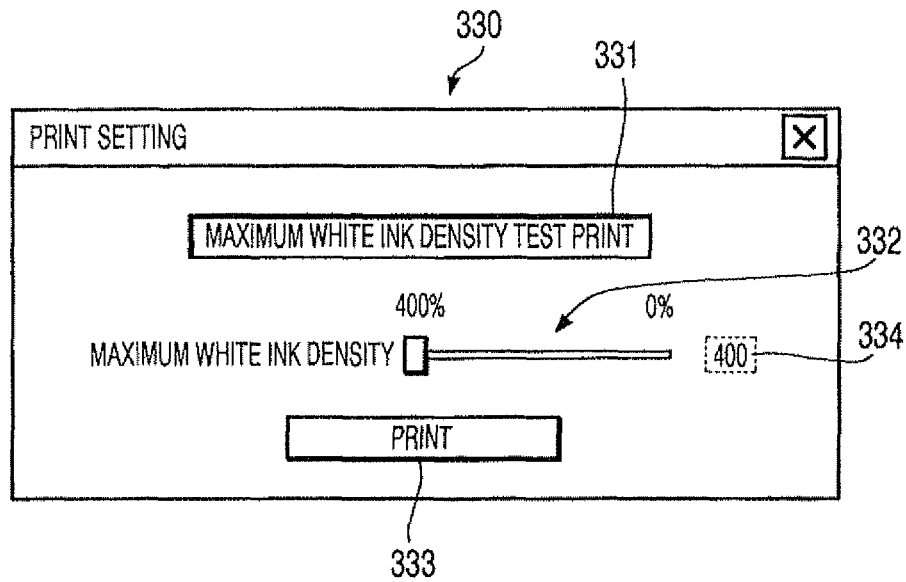
FIG. 24 illustrates a window to be displayed on the monitor screen of the PC according to an additional embodiment of the present invention.

In the first and the second embodiments, the maximum base ink density and the maximum highlight ink density are individually set; however these densities may be set to be equivalent. A configuration in which the maximum base ink density and the maximum highlight ink density are equivalent will be described herein below with reference to FIGS. 9 and 24. FIG. 24 illustrates a print setting window 330 to be displayed on the monitor screen of a PC according to an additional embodiment of the present invention.

Through the print setting window 330, the maximum base ink density and the maximum highlight ink density can be entered by a maximum white ink density adjuster 332 alone. A maximum white ink density entered by the maximum white ink density adjuster 332 is displayed in a maximum white ink density indicator field 334 and utilized to be the maximum base ink density and the maximum highlight ink density in S18 and S17 respectively in the print data generating process (see FIG. 9).

A test pattern is similarly printed when a test print button 331 in the print setting window 330 is operated and the test pattern printing process as shown in FIG. 13 is started.

Figure 25:
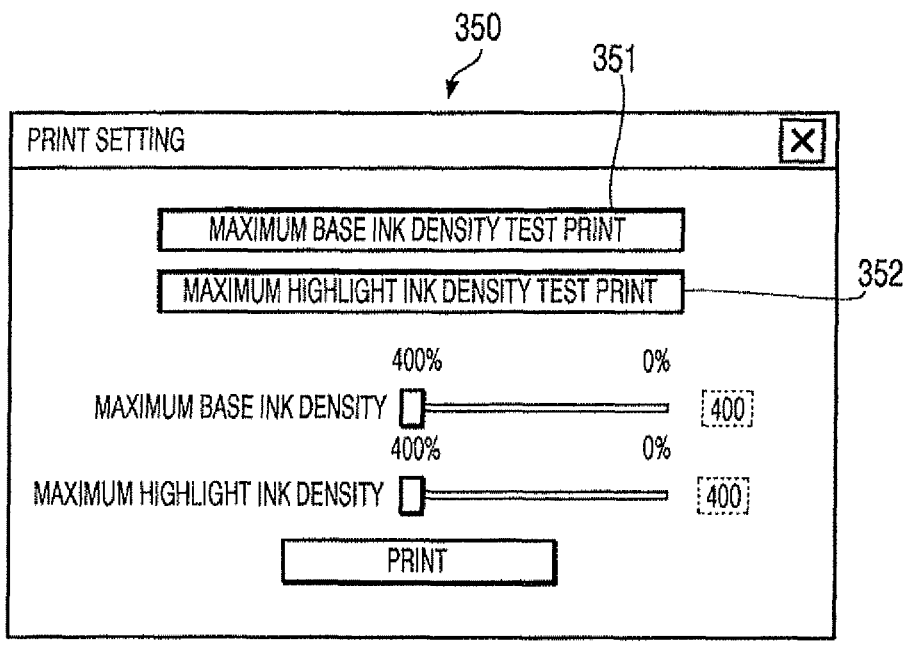
FIG. 25 illustrates a window to be displayed on the monitor screen of the PC according to a second additional embodiment of the present invention.
Figure 26:
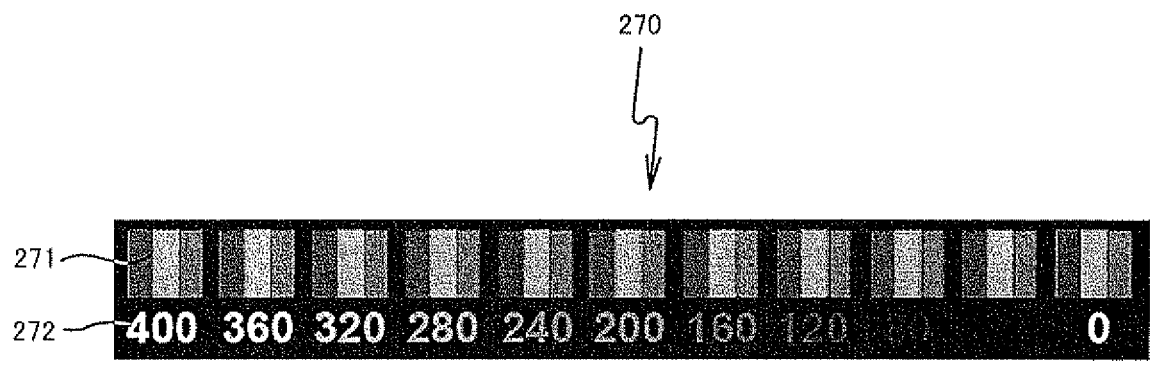
FIG. 26 illustrates a printed output of a test pattern according to the second additional embodiment of the present invention.
Figure 27:
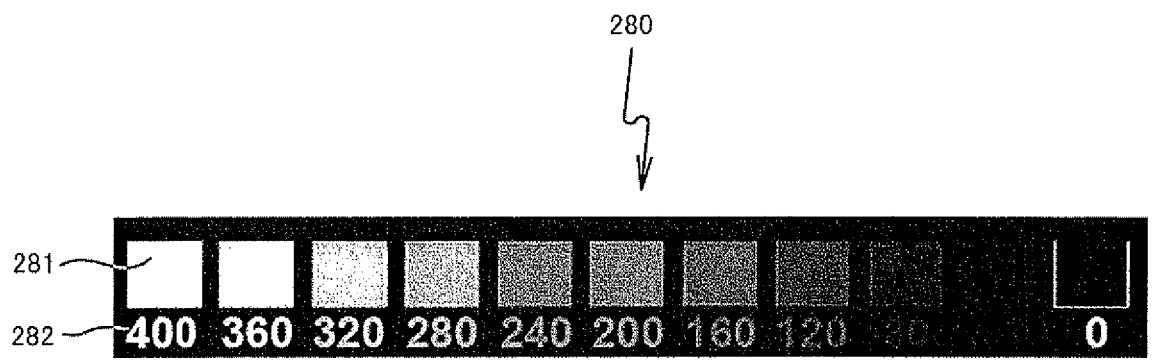
FIG. 27 illustrates a printed output of a test pattern according to the second additional embodiment of the present invention.

For another example, unlike the test patterns 250, 260, a test pattern including colored areas with the density indexes and a test pattern including highlight areas with the density indexes can be separately printed. A configuration in which the separated test patterns will be described hereinbelow with reference to FIGS. 25-27. FIG. 25 illustrates a print setting window 350 to be displayed on the monitor screen of the PC according to a second additional embodiment of the present invention. FIG. 26 illustrates a printed output of a test pattern 270 according to the second additional embodiment of the present invention. FIG. 27 illustrates a printed output of a test pattern 280 according to the second additional embodiment of the present invention.

In the print setting window 350, a test print button for base and colored layers 351 and a test print button for highlight 352 are operated to print the test pattern 270 and the test pattern 280 respectively.

Data representing the test pattern 270 is stored in the test pattern storing area 1I 66 of the HDD 116. The test pattern 270 includes the colored areas 271 formed over the base layers and the density indexes 272. The white densities of the base layers are varied to increment from 0% to 400% in the order from the rightmost to the leftmost in FIG. 26. The test pattern 270 is printed on the recording medium upon an operation to the test print button for base and colored layers 351.

Data representing the test pattern 280 is stored in the test pattern storing area 1166 of the HDD 116. The test pattern 280 includes the highlight areas 281 and the density indexes 282. The white densities of the highlight areas 281 are varied to increment from 0% to 400% in the order from the rightmost to the leftmost in FIG. 27. The test pattern 280 is printed on the recording medium upon an operation to the test print button for highlight 352.

According to the above configuration, the test pattern 270 and the test pattern 280 can be printed on separated pieces of recording media; therefore, the user can obtain a preferable one of the test patterns 270, 280 while inks for printing the other one of the test patterns 270, 280 can be saved.

The data representing the test patterns may be stored in an external storage medium, such as a CD-ROM or a USB memory. Optionally, the data may be stored in the ROM 61 of the inkjet printers 1, 500 so that the data may be obtained from the ROM 61 according to the print instructions from the PC. The ROM 61 may store a plurality of test patterns including the test patterns 250, 270, 280 so that a preferable one can be selectively printed.

What is claimed is:

1. A print data generating apparatus to generate print data, which is to be used in a printing apparatus to form an image in a plurality of colors of colorants including a white colorant, based on originally inputted image data representing the image, comprising:

a maximum density setting unit, through which a maximum allowable density of the white colorant to be used to form the image is designated;

an image storing unit to store the originally inputted image data;

a data convertor unit to convert the originally inputted image data into a colorant-enabled data, which is information concerning pixels composing the image in scale values of the plurality of colors; and a density-adjusted data generating unit to generate white density-adjusted data, in which the scale values of the pixels in the colorant-enabled data are adjusted according to the maximum allowable density of the white colorant designated through the maximum density setting unit, wherein the density-adjusted data generating unit adjusts the scale values of white in the pixels in the colorant-enabled data to be lower than or equal to scale values corresponding to the maximum allowable density by obtaining a ratio of the maximum allowable density with respect to a predetermined maximum capable density, which is a maximum density of the white colorant to be used to form the pixels in the printing apparatus, and multiplying the scale values of white in the pixels by the obtained ratio.

2. The print data generating apparatus according to claim 1, wherein:

the information representing the scale values of white in each pixel is one of white base data for forming a base layer, on which colored layer is formed, on a recording medium and white highlight data for forming a highlight portion, on which no colored layer is formed;

the maximum density setting unit includes:
  a first maximum density setting unit, through which a first maximum allowable density of the white colorant to be used to form the base layer is designated; and
  a second maximum density setting unit, through which a second maximum allowable density of the white colorant to be used to form the highlight portion is designated;

the print data generating apparatus is provided with a white data judging unit to judge as to whether the information representing the scale value of white in a currently marked pixel in the pixels is the white base data or the white highlight data;

the density-adjusted data generating unit adjusts the scale value of white in the marked pixel to be lower than or equal to a scale value corresponding to the first maximum allowable density when the information representing the scale value of white in the marked pixel is judged to be the white base data; and the density-adjusted data generating unit adjusts the scale value of white in the marked pixel to be lower than or equal to a scale value corresponding to the second maximum allowable density when the data representing the scale value of white in the marked pixel is judged to be the white highlight data.

3. The print data generating apparatus according to claim 1, comprising a maximum allowable density judging unit to judge as to whether the maximum allowable density designated through the maximum density setting unit is greater than a predetermined maximum capable density, which is a maximum density of the white colorant to be used to form the pixels in the printing apparatus;

wherein the density-adjusted data generating unit converts the scale values of white in the pixels in the colorant-enabled data into data in a printable format which is supported by the printing apparatus when the maximum allowable density designated through the maximum density setting unit is greater than the predetermined maximum capable density of the printing apparatus.

4. The print data generating apparatus according to claim 3, wherein:

the density-adjusted data generating unit divides the maximum allowable density by the predetermined maximum capable density to obtain a quotient and a remainder and generates a number of pieces of first white data, the number corresponding to the quotient, and a piece of second white data indicating a density of white of the white colorant, the density of the white colorant in the second data corresponding to the remainder; and the density-adjusted data generating unit sets the scale values of white in the first white data to be the scale values corresponding to the maximum allowable density and adjusts the scale values of white in the second white data by multiplying the scale values of the pixels in the colorant-enabled data by the a ratio of the remainder with respect to the predetermined maximum capable density.

5. The print data generating apparatus according to claim 1, comprising:

a brightness indicative data receiving unit to receive data concerning brightness of a surface of the recording medium, which is transmitted from the printing apparatus; and a density determining unit to obtain a predetermined density of white corresponding to the brightness received by the brightness indicative data receiving unit, wherein the density-adjusted data generating unit sets the predetermined density obtained by the density determining unit to be the maximum allowable density and adjusts the scale values of white in the pixels in the colorant-enabled data to be lower than or equal to scale values corresponding to the maximum allowable density.

6. The print data generating apparatus according to claim 5, comprising a density indicative table storing unit to store a density indicative table, which defines correspondence between possible brightness of the recording medium and a density of the white colorant preferable to the brightness, wherein the density determining unit obtains the predetermined density of white corresponding to the brightness with reference to the density indicative table.

7. The print data generating apparatus according to claim 1, comprising:

a test pattern data storing unit to store test pattern data, which represents at least one of test patterns, each test pattern including a plurality of density-indicative graphics, in which densities of the colorants to form the graphics are varied in steps;

a test pattern designating unit to designate the test pattern data to be transmitted to the printing apparatus; and a transmission unit to transmit the designated test pattern data to the printing apparatus.

8. The print data generating apparatus according to claim 7, wherein the test patterns include:

a first test pattern including a plurality of white portions, in which densities of the white colorant to form the white portions are varied in steps, and a plurality of colored portions, which are layered over the respective white portions;

a second test pattern including a plurality of white portions, in which densities of the white colorant to form the white portions are varied in steps; and a third test pattern including the first test pattern and the second test pattern arranged in positions corresponding to each other.

9. The print data generating apparatus according to claim 8, wherein the test pattern data includes index data which represents indexes to indicate the densities of the white colorant in the plurality of white portions.

10. The print data generating apparatus according to claim 9, wherein the indexes are numerical values which indicate the densities of the white colorant in the plurality of white portions.

11. The print data generating apparatus according to claim 9, wherein the indexes correspond to the maximum allowable density to be designated through the maximum density setting unit.

12. The print data generating apparatus according to claim 1, wherein the image data is represented in a color space configured with colors of RGB, which are red, green, and blue.

13. The print data generating apparatus according to claim 1, wherein the colorant-enabled image data represents the image in a colors of CMYKW, which are cyan, magenta, yellow, black, and white.

14. A printing apparatus to form an image in a plurality of colors of colorants including a white colorant based on print data, comprising:
   a data receiver unit to receive the print data transmitted from a print data generating apparatus;
   a plurality of print heads to eject the plurality of colorants onto a recording medium;
   a medium holder to hold the recording medium in a printable posture;
   a drive unit to drive at least one of the plurality of print heads and the medium holder according to the print data; and
   a print control unit to controls the plurality of print heads and the drive unit to form the image on the recording medium according to the print data, in which scale values of the white colorant are adjusted to be lower than or equal to scale values corresponding to a predetermined maximum allowable density by obtaining a ratio of the maximum allowable density with respect to a predetermined maximum capable density, which is a maximum density of the white colorant to be used to form the pixels in the printing apparatus, and multiplying the scale values of white in the pixels by the obtained ratio.

15. The printing apparatus according to claim 14, comprising:
   a brightness measurer to measure brightness of the recording medium held on the medium holder; and
   a data transmitter unit to transmit the measured brightness to the print data generating apparatus,
   wherein the print control unit controls the plurality of print heads and the drive unit to form the image on the recording medium according to the print data, in which scale values of the white colorant are adjusted to be lower than or equal to the scale values corresponding to the predetermined maximum allowable density being determined based on the brightness.

16. A printing apparatus to form an image in a plurality of colors of colorants including a white colorant based on print data, comprising:
   a plurality of print heads to eject the plurality of colorants onto a recording medium;
   a medium holder to hold the recording medium in a printable posture;
   a drive unit to drive at least one of the plurality of print heads and the medium holder according to the print data;
   a print control unit to control the plurality of print heads and the drive unit to form the image on the recording medium according to the print data, in which scale values of the white colorant are adjusted to be lower than or equal to scale values corresponding to a predetermined maximum allowable density by obtaining a ratio of the maximum allowable density with respect to a predetermined maximum capable density, which is a maximum density of the white colorant to be used to form the pixels in the printing apparatus, and multiplying the scale values of white in the pixels by the obtained ratio;
   a test pattern data storing unit to store test pattern data, which represents at least one of test patterns, each test pattern including a plurality of density-indicative graphics, in which densities of the colorants to form the graphics are varied in steps, the test patterns including:
      a first test pattern including a plurality of white portions, in which densities of the white colorant to form the white portions are varied in steps, and a plurality of colored portions, which are layered over the respective white portions;
      a second test pattern including a plurality of white portions, in which densities of the white colorant to form the white portions are varied in steps; and
      a third test pattern including the first test pattern and the second test pattern arranged in positions corresponding to each other; and
   a test pattern designating unit to designate the test pattern data to be transmitted to the printing apparatus,
   wherein the print control unit controls the plurality of print heads and the drive unit to form one of the first test pattern, the second test pattern, and the third test pattern according to the test pattern data.

17. The printing apparatus according to claim 16, wherein the test pattern data includes index data which represents indexes to indicate the densities of the white colorant in the plurality of white portions.

18. The printing apparatus according to claim 17, wherein the indexes are numerical values which indicate the densities of the white colorant in the plurality of white portions.

19. The printing apparatus according to claim 16, comprising a brightness measurer to measure brightness of the recording medium held on the medium holder,
   wherein the print control unit controls the plurality of print heads and the drive unit to form the image on the recording medium according to the print data, in which scale values of the white colorant are adjusted to be lower than or equal to the scale values corresponding to a predetermined maximum allowable density being determined based on the brightness.

20. A method to generate print data to be used in a printing apparatus to form an image, based on originally inputted image data representing the image, comprising steps of:
   designating a maximum allowable density of the white colorant to be used to form the image;
   storing the originally inputted image data;
   converting the originally inputted image data into a colorant-enabled data, which is information concerning pixels composing the image in scale values of the plurality of colors; and
   generating white density-adjusted data, in which the scale values of the pixels in the colorant-enabled data are adjusted according to the maximum allowable density of the white colorant designated in the step of designating,
   wherein the scale values of white in the pixels in the colorant-enabled data are adjusted to be lower than or equal to scale values corresponding to the maximum allowable density, by obtaining a ratio of the maximum allowable density with respect to a predetermined maximum capable density, which is a maximum density of the white colorant to be used to form the pixels in the printing apparatus, and multiplying the scale values of white in the pixels by the obtained ratio, in the step of generating.

21. A non-transitory computer usable medium to comprise computer readable instructions to control a computer to generate print data, which is to be used in a printing apparatus to form an image, based on originally inputted image data representing the image, by executing steps of:
- designating a maximum allowable density of the white colorant to be used to form the image;
- storing the originally inputted image data;
- converting the originally inputted image data into a colorant-enabled data, which is information concerning pixels composing the image in scale values of the plurality of colors; and
- generating white density-adjusted data, in which the scale values of the pixels in the colorant-enabled data are adjusted according to the maximum allowable density of the white colorant designated in the step of designating,
- wherein the scale values of white in the pixels in the colorant-enabled data are adjusted to be lower than or equal to scale values corresponding to the maximum allowable density, by obtaining a ratio of the maximum allowable density with respect to a predetermined maximum capable density, which is a maximum density of the white colorant to be used to form the pixels in the printing apparatus, and multiplying the scale values of white in the pixels by the obtained ratio, in the step of generating.

* * * * *